United States Patent [19]

Nishio et al.

[11] Patent Number: 5,719,574
[45] Date of Patent: Feb. 17, 1998

[54] DIGITAL AUDIO TRANSMISSION APPARATUS

[75] Inventors: Ayataka Nishio, Kanagawa; Yasuhiro Ogura, Tokyo; Gen Ichimura, Tokyo; Makoto Akune, Tokyo, all of Japan

[73] Assignee: Sony Corporation, Tokyo, Japan

[21] Appl. No.: 511,162

[22] Filed: Aug. 4, 1995

Related U.S. Application Data

[63] Continuation-in-part of Ser. No. 395,242, Dec. 24, 1995, Pat. No. 5,574,453.

[30] Foreign Application Priority Data

Mar. 3, 1994 [JP] Japan .................................. 6-033822
Mar. 3, 1995 [JP] Japan .................................. 7-044271

[51] Int. Cl.[6] .............................. H04N 1/38; H03M 7/00
[52] U.S. Cl. ........................ 341/143; 341/144; 358/400
[58] Field of Search ........................... 341/155, 143, 341/144; 358/400, 261

[56] References Cited

U.S. PATENT DOCUMENTS 4,775,851 10/1988 Borth .................................. 341/155
5,450,381 9/1995 Tsukamura et al. ................ 369/13

Primary Examiner—Jeffrey A. Gaffin
Assistant Examiner—Peguy JeanPierre
Attorney, Agent, or Firm—Jay H. Maioli

[57] ABSTRACT

An audio signal recording device having an input terminal, a modulator for modulating an input signal, a detecting circuit for detecting whether an input signal maintains a fixed value for a predetermined period of time, a signal generator for generating an idling signal, a delay circuit for delaying a modulated input signal and a switch for alternately inputting either the idling signal or modulated input signal to a recording circuit.

15 Claims, 16 Drawing Sheets

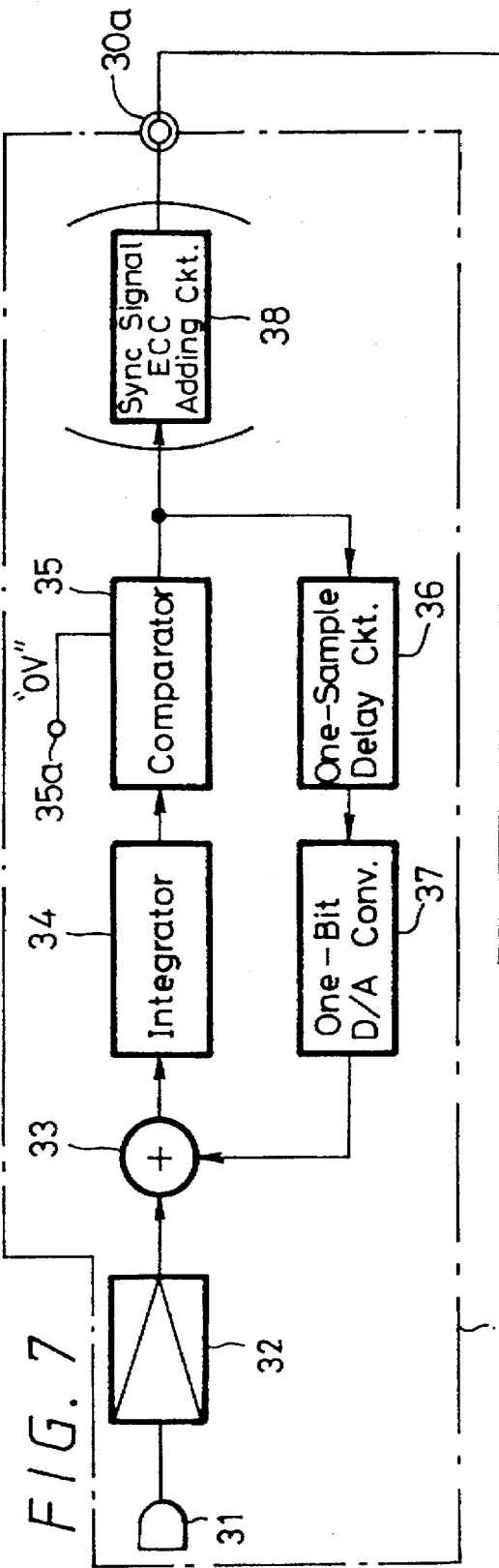
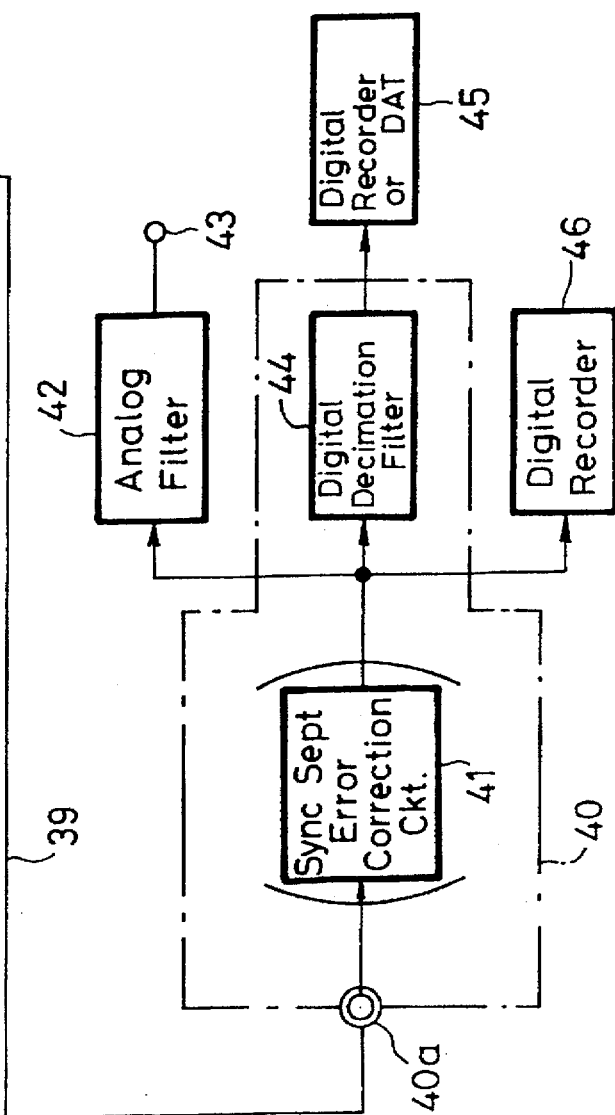
FIG. 7

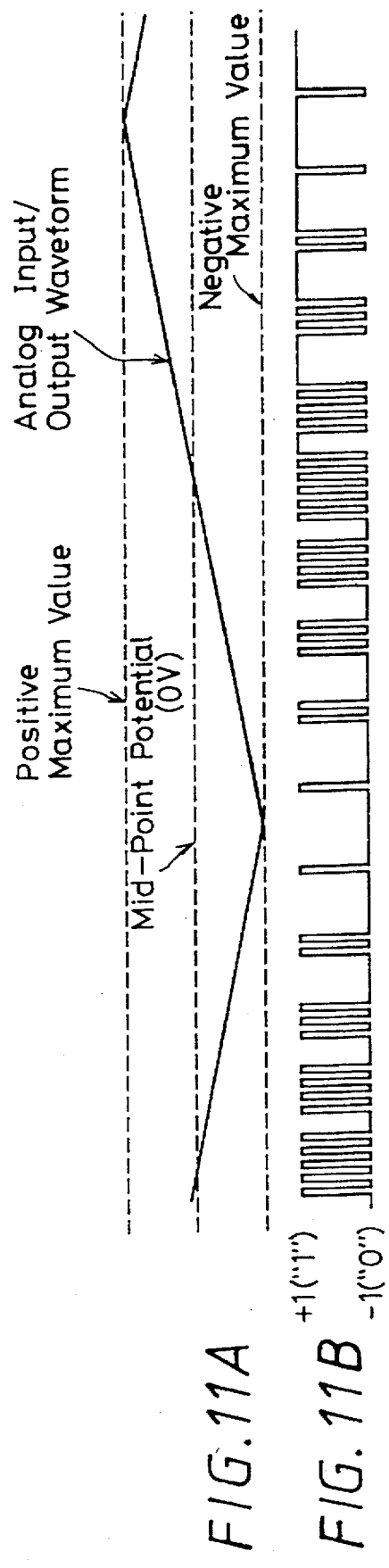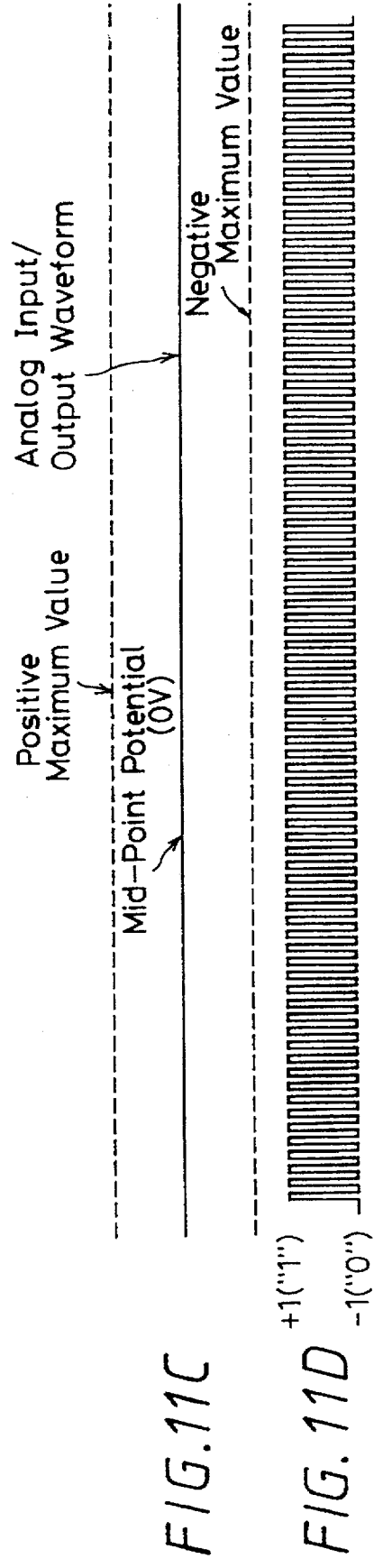

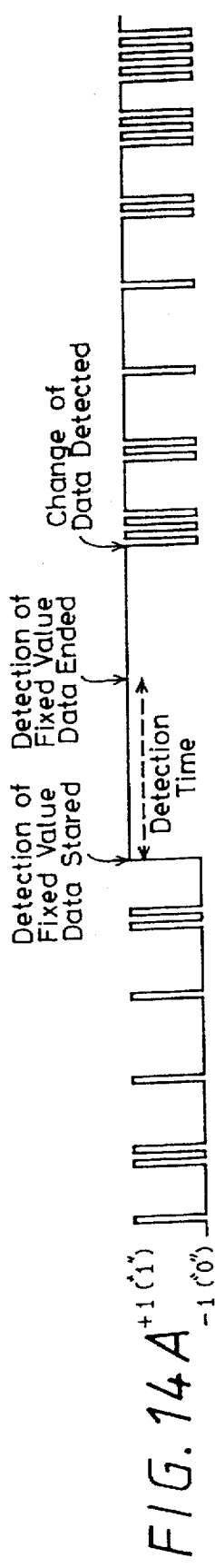
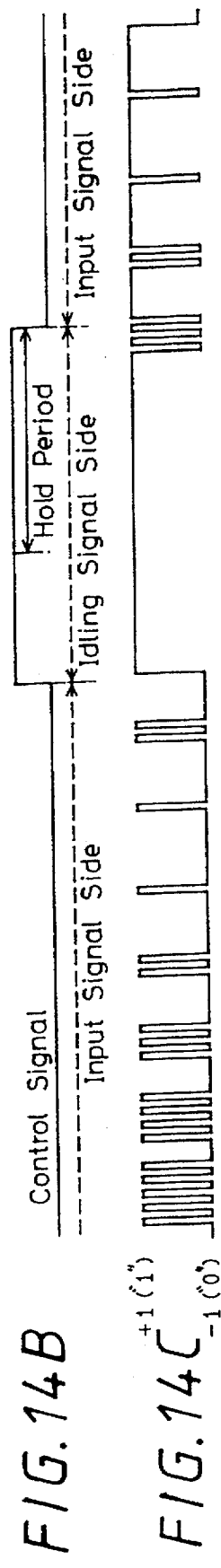
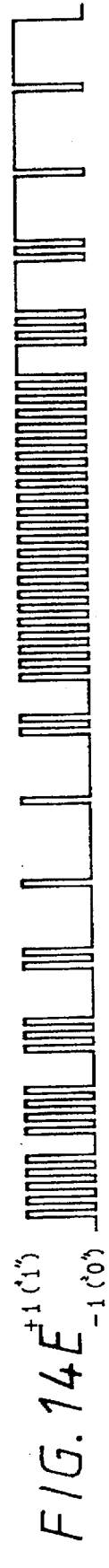
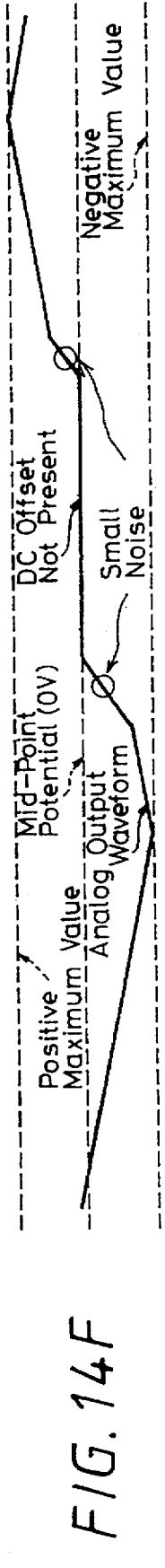
FIG. 14A
FIG. 14B
FIG. 14C
FIG. 14D
FIG. 14E
FIG. 14F

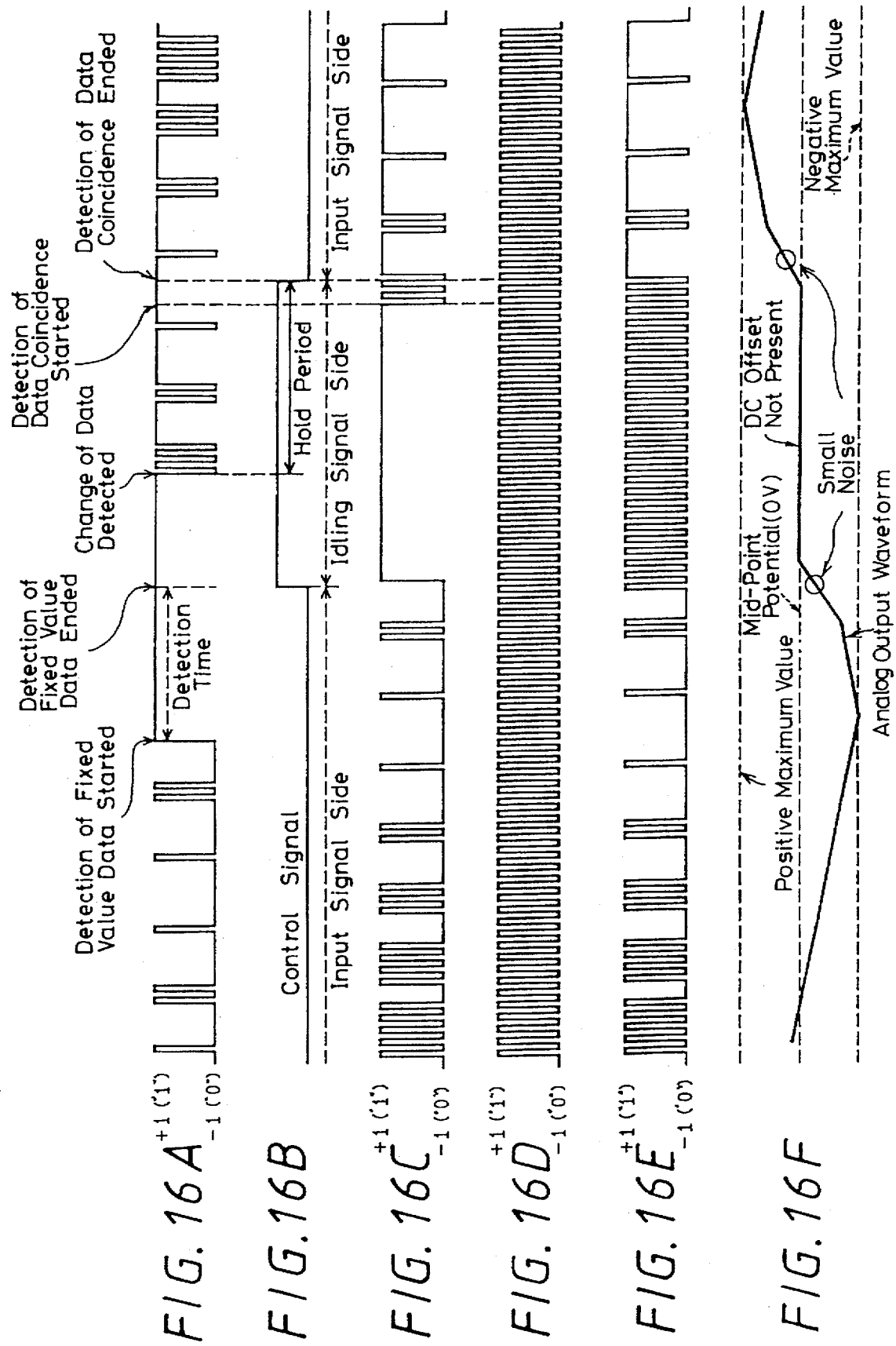

DIGITAL AUDIO TRANSMISSION APPARATUS

This application is a Continuation-In-Part application of application Ser. No. 08/395,242 filed Feb. 24, 1995, now U.S. Pat. No. 5,574,453.

FIELD OF THE INVENTION

The present invention relates to a digital audio transmission apparatus. More particularly, the present invention relates to a digital audio transmission apparatus capable of preventing damaging output signals caused by an error in a sigma-delta modulation input signal.

BACKGROUND OF THE INVENTION

As methods of digitizing and transmitting (recording and reproducing) an audio signal, there have hitherto been proposed recording and reproducing apparatus, such as a CD (compact disc) player and a DAT (digital audio tape) recorder/player and digital audio broadcasting, such as broadcast satellite or the like. The digital audio transmitting apparatus uses a format in which a sampling frequency is 48 kHz, 44.1 kHz and quantization bit number is 16 bits or the like in order to digitize an audio signal.

In the digital audio transmitting apparatus, the quantization bit number of digital audio signal generally limits a dynamic range of a demodulated audio signal. Therefore, when data of high tone quality is transmitted, the quantization bit number has to be expanded from the existing bit number, i.e., 16 bits to other bit number, such as 20 bits or 24 bits. Once the format is determined, it is not so easy to expand the quantization bit number. Thus, the digital audio transmitting apparatus cannot generate an audio signal of high tone quality.

As a method of digitizing an audio signal, there is proposed a method which is often referred to as a sigma-delta modulation. Such a method is disclosed in U.S. Pat. No. 5,351,048 (issue date: Sep. 27, 1994) to Yoshio Yamazaki. The disclosure of U.S. Pat. No. 5,351,048 is hereby incorporated by reference.

FIG. 1 of the accompanying drawings shows in block form an arrangement of an example of 1-bit sigma-delta modulation. As shown in FIG. 1, an input audio signal applied to an input terminal 91 is supplied through an adder 92 to an integrator 93. An integrated output signal from the integrator 93 is supplied to a comparator 94, in which it is compared with a mid-range potential of the input audio signal and quantized in one bit at every sample period. As a frequency (sampling frequency) of the sample period, there is used a frequency which is 64 times or 128 times as high as 44.1 kHz or 48 kHz (2.816 MHz & 5.632 MHz or 3.072 MHz & 6.144 MHz).

The quantized signal is supplied to a delay circuit 95 and thereby delayed by one sample period. The delayed signal is converted through a one-bit digital-to-analog (D/A) converter 96 to an adder 92, in which it is added with the input audio signal supplied thereto from the input terminal 91. The quantized signal output from the comparator 94 is developed at an output terminal 97. Therefore, according to the sigma-delta modulation, as described in the above-mentioned literature, it is possible to obtain a digital audio signal of wide dynamic range by sufficiently increasing the frequency (sampling frequency) of the sample period.

In the sigma-delta modulation, when the modulated (quantized) signal is transmitted (recorded and reproduced), "+1" of the quantized signal is converted to "1" and "−1" of the quantized signal is converted to "0". In that case, if an abnormality occurs in the transmission system and the signal is lost, then the signal is fixed to "1" or "0". In the sigma-delta modulation, consecutive "1" and "0" correspond to a positive maximum value and a negative maximum value of a demodulated signal, respectively. Accordingly, if a signal line is broken in the transmission system, then a noise of maximum level occurs at that very moment. As a result, a risk of damage to a monitor amplifier or loudspeaker due to excessive input signal is quite great.

In a CD player or DAT recorder/player, the signal format is determined so that the consecutive "1" and "0" become intermediate values of the demodulated signal, respectively. Thus, the occurrence of the noise of maximum level can be avoided. It is therefore proposed that data, which results from the sigma-delta modulation, is converted to data conforming to the signal format of the CD player and the DAT recorder/player by using a decimation filter. In this case, however, it becomes difficult to extract data of high audio quality from the transmitted signal by increasing the quantization bit number.

SUMMARY OF THE INVENTION

In view of the aforesaid aspect, it is an object of the present invention to provide a digital audio transmission apparatus in which a quantization bit number can be increased with ease by effecting a transmission using a so-called sigma-delta modulation.

It is another object of the present invention to provide a digital audio transmission apparatus in which a noise of maximum level can be prevented from being generated when an abnormality occurs in the transmission system by switching a quantized signal to a predetermined idling signal.

According to an aspect of the present invention, there is provided an audio signal supplying apparatus which is comprised of a sigma-delta modulating circuit for outputting a sigma-delta modulated audio signal by sigma-delta modulating an input audio signal, a detecting circuit for detecting that the sigma-delta modulated audio signal takes a fixed value during a time period longer than a predetermined time, an idling signal generating circuit for generating an idling signal corresponding to a mid-point potential of the input audio signal, a delay circuit for delaying the sigma-delta modulated audio signal by a predetermined time, and a switching circuit for switching and outputting a delayed signal from the delay circuit and the idling signal based on a detected result of the detecting circuit.

According to another aspect of the present invention, there is provided an audio signal transmission apparatus which is comprised of a microphone, a sigma-delta modulating circuit for sigma-delta modulating an audio signal supplied thereto from the microphone, a circuit for transmitting a sigma-delta modulated audio signal supplied thereto from the sigma-delta modulating circuit, and a filter for receiving and filtering out the sigma-delta modulated audio signal transmitted thereto.

According to a further aspect of the present invention, there is provided a digital audio signal recording and/or reproducing apparatus which includes a modulation unit, an addition unit, a recording and/or reproducing unit, a signal processing unit and a conversion unit. The modulation unit sigma-delta modulates an input audio signal. The addition unit adds a synchronizing signal and an error correction code to the sigma-delta modulated audio signal supplied thereto from the modulation unit. The recording and/or reproducing unit records an output signal output from the addition unit on a recording medium and/or reproduces a signal recorded on the recording medium. The signal processing unit extracts the synchronizing signal from the signal read out from the recording medium by the recording and/or reproducing unit and error-corrects the signal read out from the recording medium on the basis of the added error correction code. The conversion unit converts the output signal from the signal processing unit into a digital signal having a predetermined format.

According to still another aspect of the present invention, there is provided a digital audio signal recording and/or reproducing apparatus which includes a modulation unit, first and second conversion units and first and second recording and/or reproducing units. The modulation unit sigma-delta modulates an input audio signal. The first conversion unit converts a bit number and a sampling frequency of a digital signal supplied thereto from the modulation unit. The recording and/or reproducing unit records an output signal output thereto from the first conversion unit on a recording medium and/or reproduces a signal recorded on the recording medium. The second conversion unit converts a bit number and a sampling frequency of the digital signal supplied thereto from the first recording and/or reproducing unit into predetermined values. The second recording and/or reproducing unit records and/or reproduces the digital signal supplied thereto from the second conversion unit.

According to yet another aspect of the present invention, there is provided a microphone device including a microphone unit, an amplifier, a sigma-delta modulator and a casing. The amplifier amplifies the output signal from the microphone unit. The sigma-delta modulator modulates the output signal from the amplifier. The output terminal outputs the modulated output signal from the sigma-delta modulator and connected to an external equipment. The casing contains therein the microphone unit, the amplifier, the sigma-delta modulator and the output terminal.

BRIEF DESCRIPTION OF THE DRAWINGS

FIG. 7 is a schematic block diagram showing a digital audio transmission apparatus according to a third embodiment of the present invention;

FIG. 11A is a schematic diagram used to explain a sigma-delta modulated signal;

FIG. 11B is a schematic diagram used to explain a sagma-delta modulated signal;

FIG. 11C as a schematic diagram used to explain a sagma-delta modulated signal;

FIG. 11D is a schematic diagram used to explain a sagma-delta modulated signal;

FIG. 14A is a schematic diagram used to explain operation of the digital audio transmission apparatus shown in FIG. 13;

FIG. 14B is a schematic diagram used to explain operation of the digital audio transmission apparatus shown in FIG. 13;

FIG. 14C is a schematic diagram used to explain operation of the digital audio transmission apparatus shown in FIG. 13;

FIG. 14D is a schematic diagram used to explain operation of the digital audio transmission apparatus shown in FIG. 13;

FIG. 14E is a schematic diagram used to explain operation of the digital audio transmission apparatus shown in FIG. 13;

FIG. 14F is a schematic diagram used to explain operation of the digital audio transmission apparatus shown in FIG. 13;

FIG. 16A is a diagram used to explain operation of the digital audio transmission apparatus shown in FIG. 15; an eighth embodiment of the present invention;

FIG. 16B is a diagram used to explain operation of the digital audio transmission apparatus shown in FIG. 15;

FIG. 16C is a diagram used to explain operation of the digital audio transmission apparatus shown in FIG. 15; an eighth embodiment of the present invention;

FIG. 16D is a diagram used to explain operation of the digital audio transmission apparatus shown in FIG. 15;

FIG. 16E is a diagram used to explain operation of the digital audio transmission apparatus shown in FIG. 15; an eighth embodiment of the present invention;

FIG. 16F is a diagram used to explain operation of the digital audio transmission apparatus shown in FIG. 15;

DETAILED DESCRIPTION OF THE INVENTION

Figure 1:
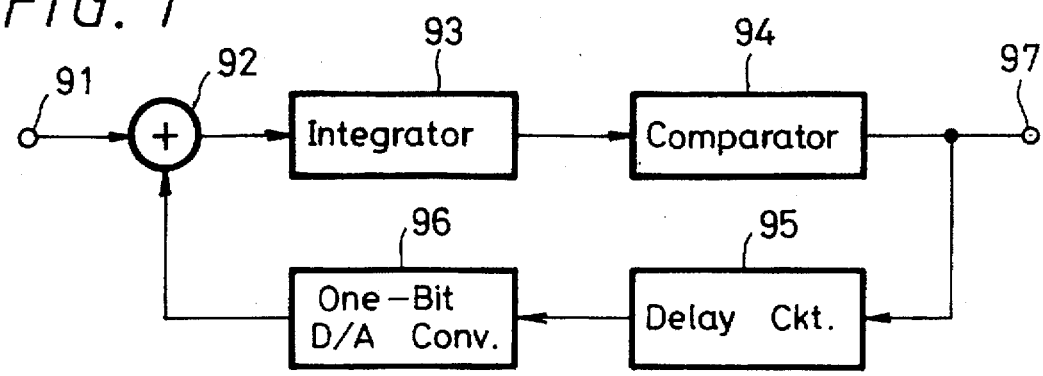
FIG. 1 is a block diagram showing an example of a sigma-delta modulation.
Figure 2:
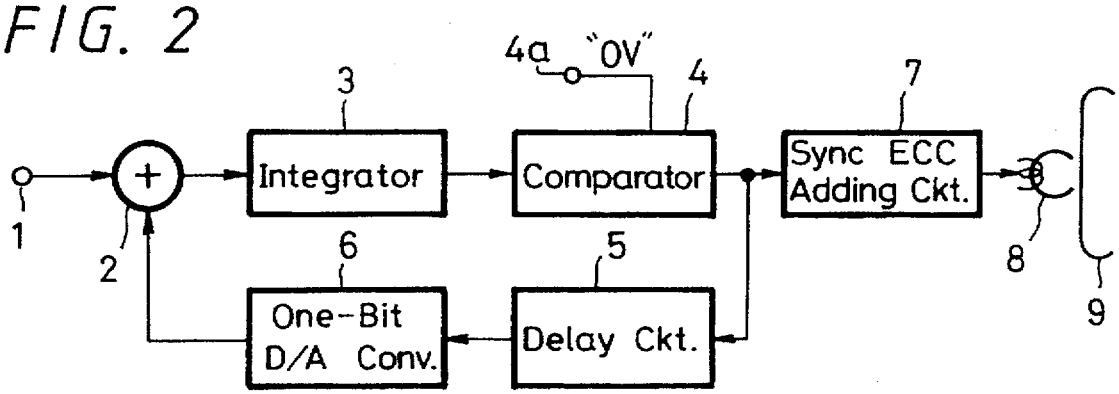
FIG. 2 is a block diagram showing a recording system of a digital audio transmission apparatus according to an embodiment of the present invention.

The present invention will now be described with reference to the drawings. As shown in FIG. 2, an input audio signal from an input terminal 1 is supplied through an adder 2 to an integrator 3. A signal from the integrator 3 is supplied to a comparator 4, in which it is compared with a mid-point potential of the input audio signal supplied from a terminal 4a and quantized in one bit at every sampling period. A frequency (sampling frequency) in the sampling period is 64 times or 128 times as high as the sampling frequencies 48 kHz and 44.1 kHz.

The quantized signal is delayed by one sample period by a delay circuit 5. The delayed signal from the delay circuit 5 is supplied through a one-bit D/A converter 6 to the adder 2, in which it is added to/with the input audio signal supplied thereto from the input terminal 1. Thus, the comparator 4 outputs a quantized signal which results from sigma-delta modulating the input audio signal. The quantized signal output from the comparator 4 is supplied to a synchronizing (sync) signal and error correction code (ECC) adding circuit 7, in which the quantized signal of every predetermined number of samples is added with a sync signal and an error correction code. The quantized signal with the sync signal and the error correction code is supplied to a recording head 8 and thereby recorded on a magnetic tape 9 serving as a recording medium.

Figures 3A, 3B:
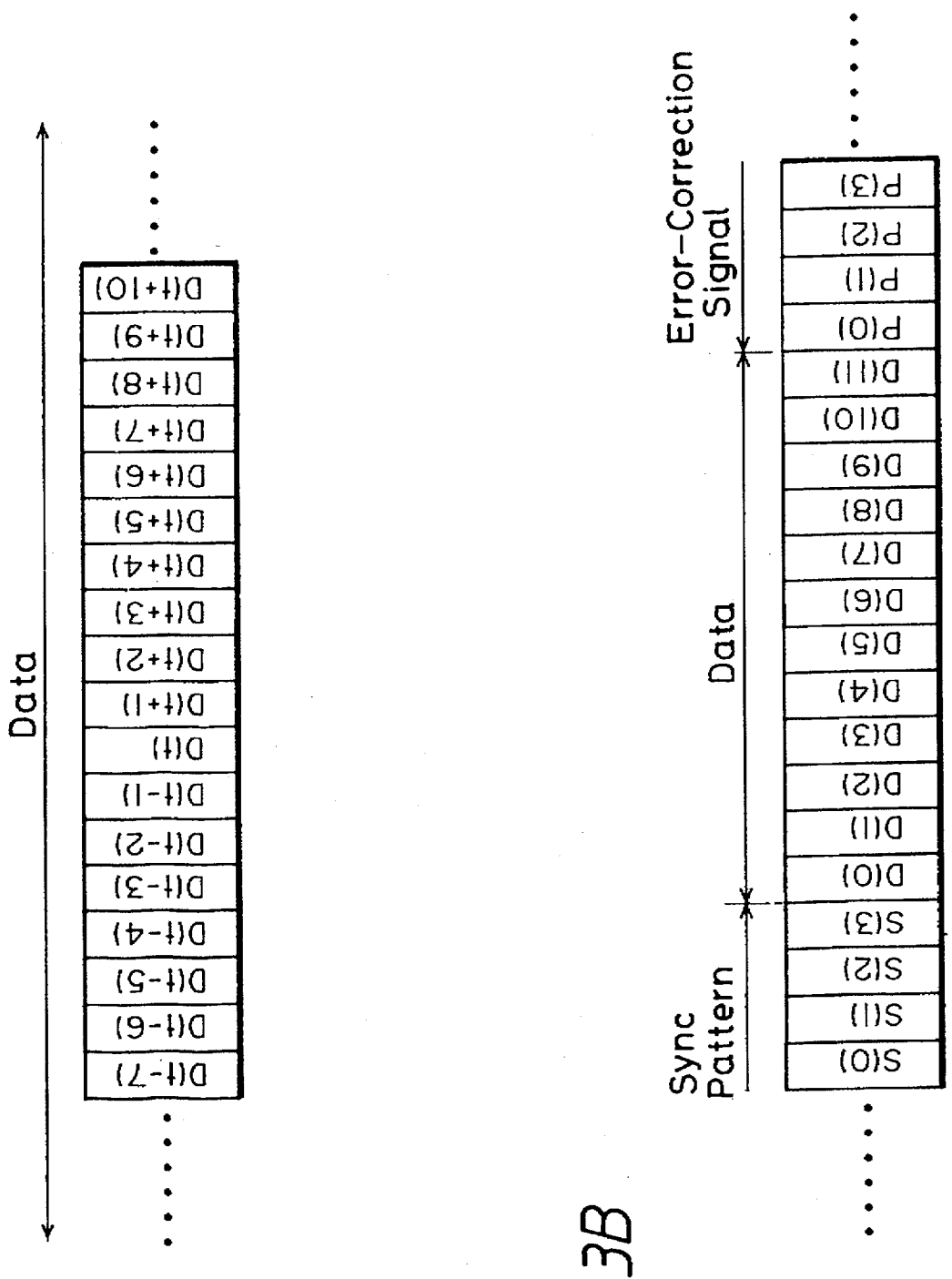
FIG. 3A is a schematic diagram showing a format of a signal recorded on a recording medium.
FIG. 3B is a schematic diagram showing a format of a signal recorded on a recording medium.

FIGS. 3A and 3B show a format of a signal recorded on the magnetic tape 9. The quantized signal may be recorded on the magnetic tape 9 in the form of original data D(t−7), D(t−6), ..., D(t−1), D(t), D(t+1), ..., D(t+9), D(t+10) as shown in FIG. 3A. Alternatively, as shown in FIG. 3B, the quantized signal may be divided at every 12 data D(0) to D(11) and sync signals S(0) to S(3) and error correction codes P(0) to P(3) such as parity may be added to every 12 data D(0) to D(11), thereby making it possible to detect and correct a transmission error occurred during transmission (recording and reproducing). Furthermore, in the recording and reproducing apparatus, data may be interleaved in order to satisfactorily avoid a burst error occurred in the magnetic tape 9 serving as the recording medium.

Figure 4:
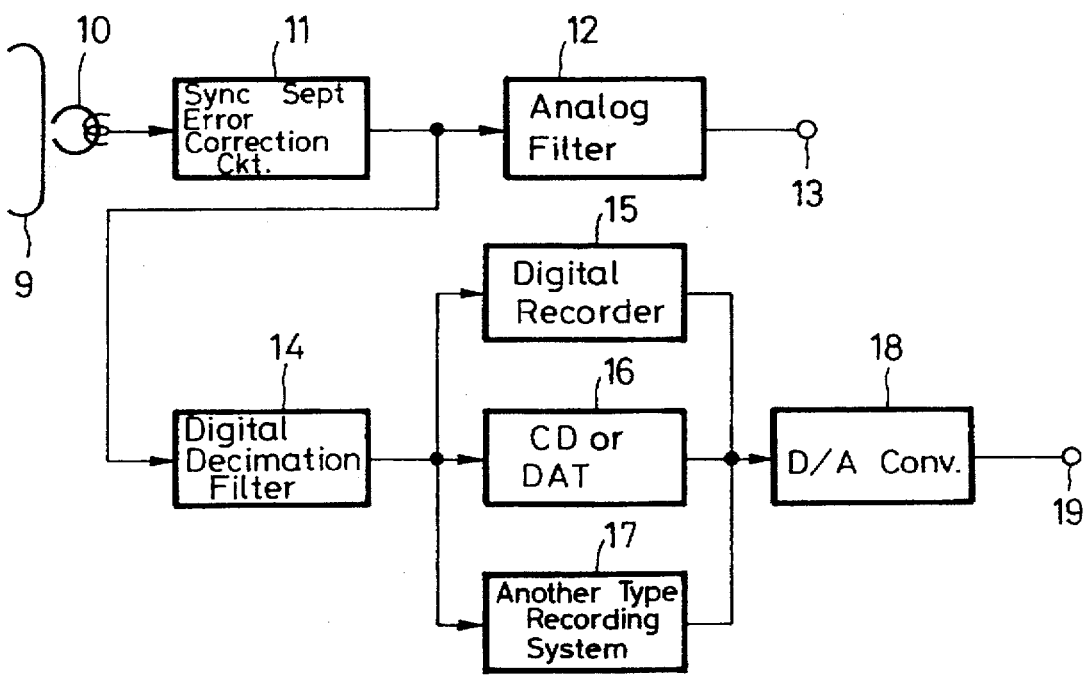
FIG. 4 is a block diagram showing a reproducing system of the digital audio transmission apparatus according to the embodiment of the present invention.

As shown in FIG. 4, the signal recorded on the magnetic tape 9 is reproduced by a reproducing head 10. The reproduced signal is supplied to a sync separation and error correction circuit 11 which derives a quantized signal which results from sigma-delta modulating the input audio signal. The sigma-delta modulated quantized signal is converted by an analog filter 12 into an analog signal. The analog audio signal is output through an output terminal 13.

The sigma-delta modulated quantized signal from the sync separation and error correction circuit 11 is converted by a digital decimation filter 14 to a signal of arbitrary format, such as CD format and DAT format or the like. The signal converted to the arbitrary signal format is supplied through a reproducing system 15 of digital recorder, a reproducing system 16 of CD and DAT or another type of digital recording system 17 to a digital-to-analog (D/A) converter 18, in which it is converted into an analog audio signal. The resulting analog audio signal is output through an output terminal 19.

Figure 5A:
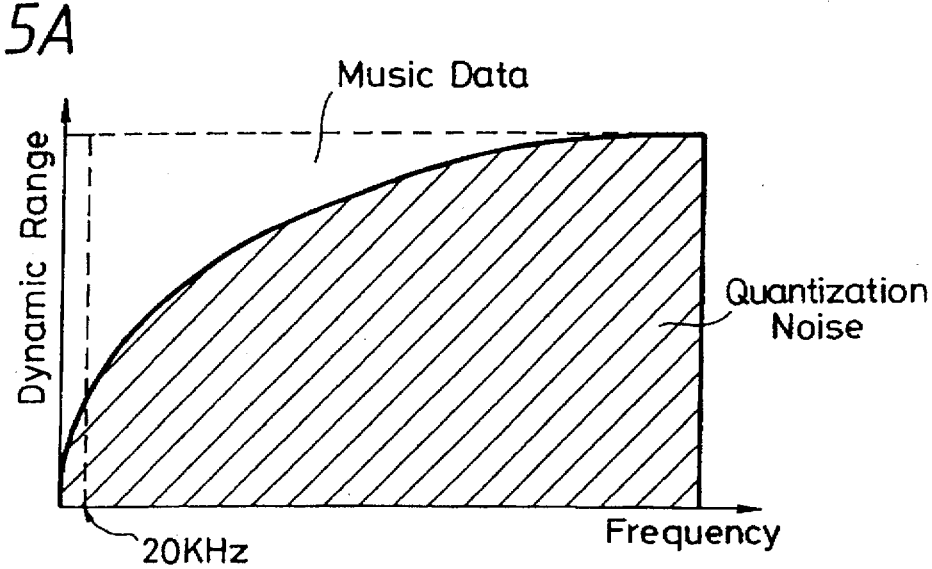
FIG. 5A is a diagram used to explain operation of the digital audio transmission apparatus shown in FIG. 4.
Figure 5B:
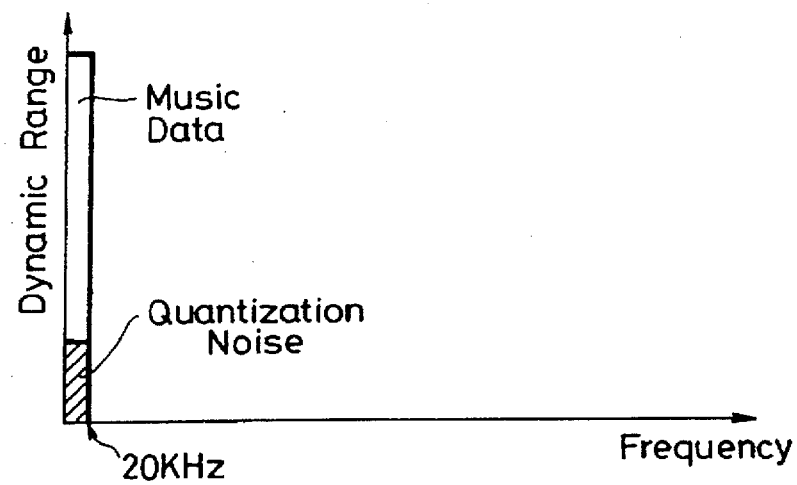
FIG. 5B is a diagram used to explain operation of the digital audio transmission apparatus shown in FIG. 4.

In this way, the input audio signal is sigma-delta modulated and recorded on the recording medium. The signal recorded on the recording medium is reproduced with the arbitrary signal format. The sigma-delta modulated signal has a frequency spectrum shown in FIG. 5A. A quantization noise shown hatched is reduced in a frequency of less than 20 kHz in a hearing area as compared with a signal format, such as CD format and DAT format shown in FIG. 5B and therefore a wide dynamic range can be obtained.

Figure 5C:
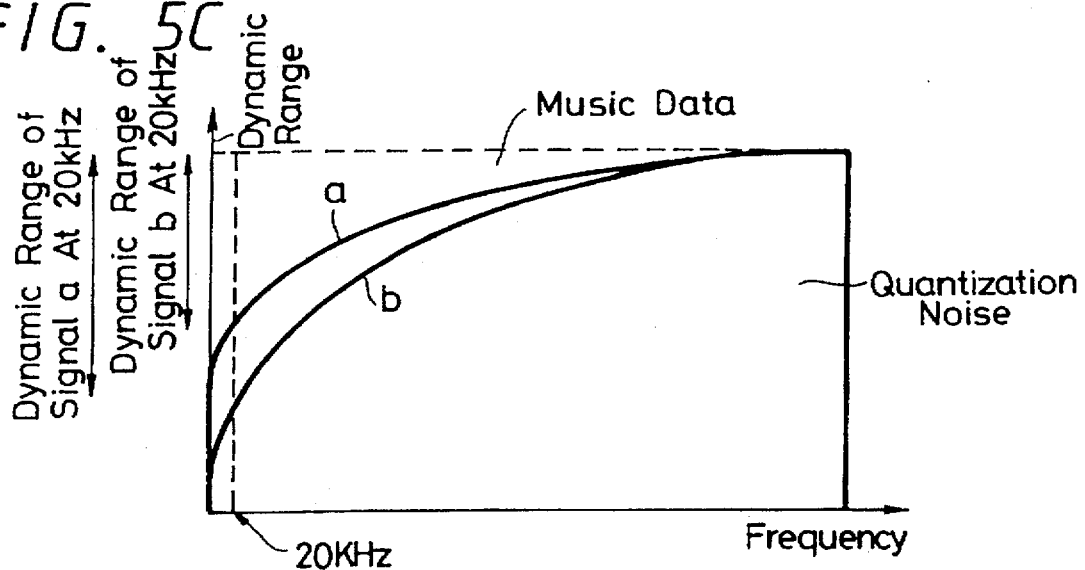
FIG. 5C is a diagram used to explain operation of the digital audio transmission apparatus shown in FIG. 4.

In FIG. 5C, when a curve a represents a spectrum of a sigma-delta modulated signal from the existing sigma-delta modulation circuit, there is then the possibility that a sigma-delta modulation circuit which outputs a sigma-delta modulated signal whose frequency spectrum is shown by a curve b is developed. In that case, it is possible to enhance performance of the above-mentioned recording and reproducing apparatus by changing only the sigma-delta modulation circuit while the recording format and a rest of the arrangement are not changed.

Further, since the sampling frequency can be set to extremely high frequency, such as frequencies 64 times or 128 times as high as the sampling frequencies of 48 kHz and 44.1 kHz, it is possible to considerably expand a frequency band of a recorded audio signal from the frequency band of 20 kHz.

Figure 6:
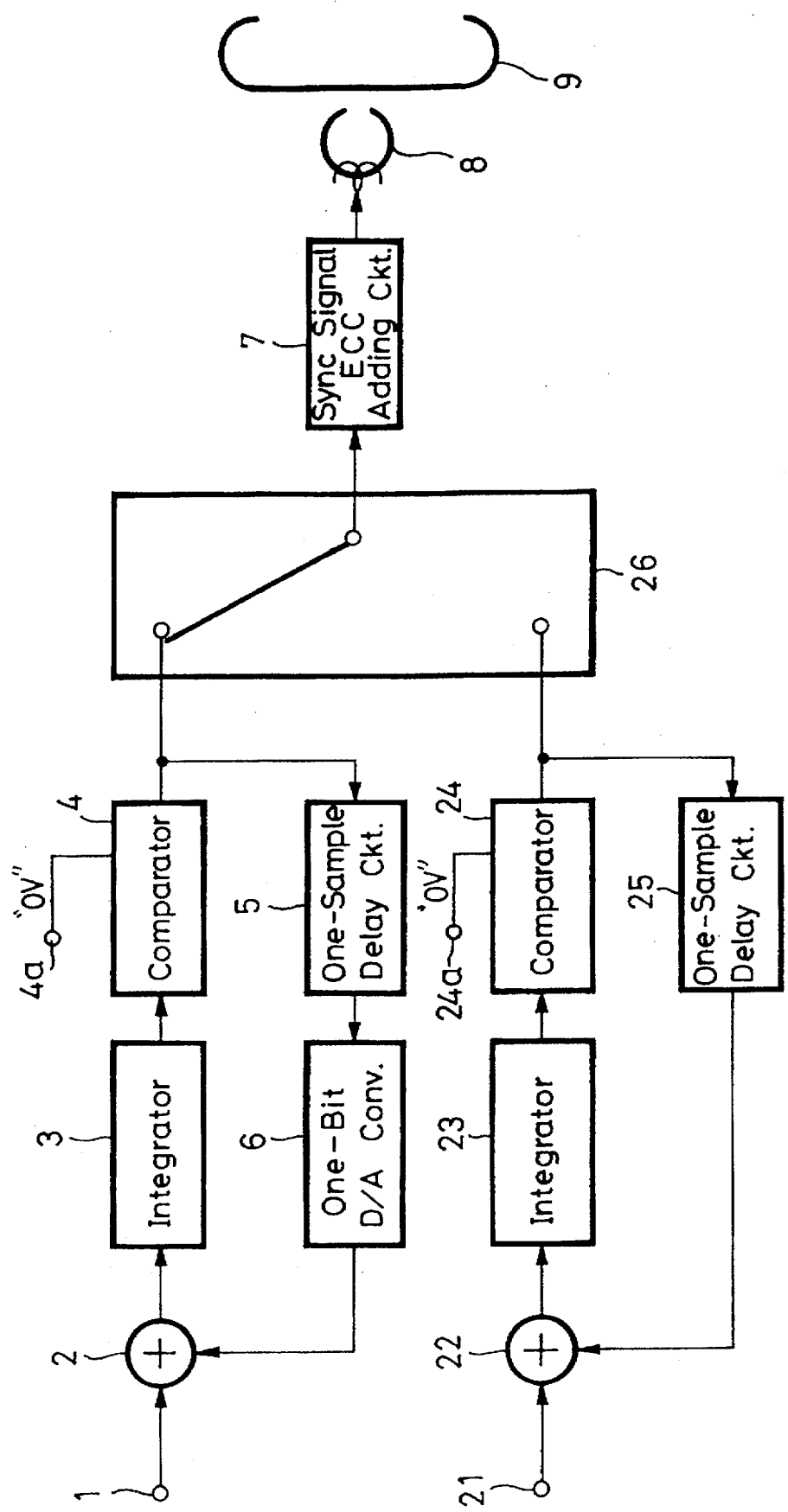
FIG. 6 is a schematic block diagram showing a digital audio transmission apparatus according to a second embodiment of the present invention.

As described above, according to the recording and reproducing apparatus, it is possible to increase the quantization bit number with ease by transmitting the audio signal with the sigma-delta modulation. In the recording and reproducing apparatus, when an input audio signal is supplied in the form of a digital signal, the signal delayed by one sampling period by the delay circuit 5 need not be converted by the one-bit D/A converter 6. FIG. 6 shows in block form a digital audio transmission apparatus according to a second embodiment of the present invention. In FIG. 6, like parts corresponding to those of FIG. 2 are marked with the same references and therefore need not be described in detail. As shown in FIG. 6, the analog audio signal applied to the analog input terminal 1 is supplied to and processed by the aforesaid circuits. Particularly, in FIG. 6, there is provided a digital input terminal 21. FIG. 6 shows an arrangement of a recording system using one-bit sigma-delta modulation, for example.

As shown in FIG. 6, a digital audio signal applied to the digital input terminal 21 is supplied to an adder 22, an integrator 23, a comparator 24 and a delay circuit 25 which are the same in operation and digital circuit arrangement as those of the adder 2, the integrator 3, the comparator 4 and the delay circuit 5. A D/A converter which corresponds to the D/A converter 6 need not be provided. An output signal from the comparator 24 and the output signal from the comparator 4 are selected by a selector switch 26 and supplied to the sync signal and error correction code adding circuit 7. It is possible to arrange a digital audio recording and reproducing apparatus which can record and reproduce both of an analog audio signal and a digital audio signal. Alternatively, it is possible to arrange a recording and reproducing apparatus which can record and reproduce only a digital audio signal.

FIG. 7 shows in block form an arrangement of the digital audio transmission apparatus according to a third embodiment of the present invention which is applied to a microphone device 30. The microphone device 30 shown in FIG. 7 uses a one-bit sigma-delta modulation. It will be appreciated by those skilled in the art that the present invention is not limited to input sources of microphones only. Input sources may include, for example, musical instruments, MIDI devices, tape recorders, CD players, etc.

As shown in FIG. 7, an audio signal from a microphone unit 31 is supplied through an amplifier 32 to an adder 33. An output signal from the adder 33 is supplied to an integrator 34. An integrated signal output from the integrator 34 is supplied to a comparator 35, in which it is compared with a mid-point potential of an input audio signal input thereto from a terminal 35a and quantized in one bit at every sampling period. A frequency (sampling frequency) of the sampling period is a sampling frequency 64 times or 128 times as high as the sampling frequency of 48 kHz and 44.1 kHz.

The quantized signal from the comparator 35 is supplied to and delayed by a delay time of one sampling period by a delay circuit 36. The delayed signal from the delay circuit 36 is supplied to and converted by a one-bit D/A converter 37 into an analog audio signal. The analog audio signal from the D/A converter 37 is supplied to the adder 33, in which it is added with the audio signal amplified by the amplifier 32. Thus, the comparator 35 outputs the quantized signal which results from sigma-delta modulating the audio signal supplied from the microphone unit 31. The quantized signal output from the comparator 35 is supplied to a sync signal and error correction code adding circuit 38, in which the quantized signal is added with a sync signal and an error correction code after a predetermined number of samples. In FIG. 7, the microphone device 30 has a casing which contains the microphone unit 31, the amplifier 32, the adder 33, the integrator 34, the comparator 35, the delay circuit 36, the D/A converter 37, the adding circuit 38 and an output terminal 30a.

The quantized signal added with the sync signal and the error correction code is output from the output terminal 30a and transmitted through a transmission line 39. The transmission line 39 is connected between the input terminal 30a of the microphone device 30 and an input terminal of an audio equipment 40. The signal thus transmitted is supplied to a sync separation and error correction circuit 41 of the external audio equipment 40 which derives a quantized signal in which the audio signal from the microphone unit 31 is sigma-delta modulated. The sigma-delta modulated quantized signal from the sync separation and error correction circuit 41 is converted by an analog filter 42 into an analog audio signal. The resulting analog audio signal is output through an output terminal 43.

Alternatively, the sigma-delta modulated quantized signal output from the sync separation and error correction circuit 41 is converted by a digital decimation filter 44 into a signal with a suitable signal format, such as signal format of arbitrary CD and DAT. The signal with the above arbitrary signal format is recorded by a digital recorder 45 of arbitrary format, such as DAT format or the like. The sigma-delta modulated quantized signal output from the sync separation and error correction circuit 41 may be recorded by a digital recorder 46 as it is.

Accordingly, since the microphone device 30 uses the sigma-delta modulation, it is possible to satisfactorily transmit a digital audio signal without deteriorating a tone quality when using a relatively long transmission line 39. The body of the microphone device 30 needs a sigma-delta modulation circuit and a complex A/D converter or the like need not be provided. Therefore, it is possible to realize a simple, miniaturized and light weight microphone apparatus.

With regard to the microphone apparatus/input source, when there is no risk that an input signal will be deteriorated because the length of the transmission line 39 is of a limited length, it is possible to remove the sync signal and error correction code adding circuit 38 and the sync separation and error correction circuit 41. The transmission line 39 is not limited to a wire transmission line and a digital audio signal can be transmitted via radio or infrared waves, or the like by use of an appropriate transmitter and receiver.

Figure 8:
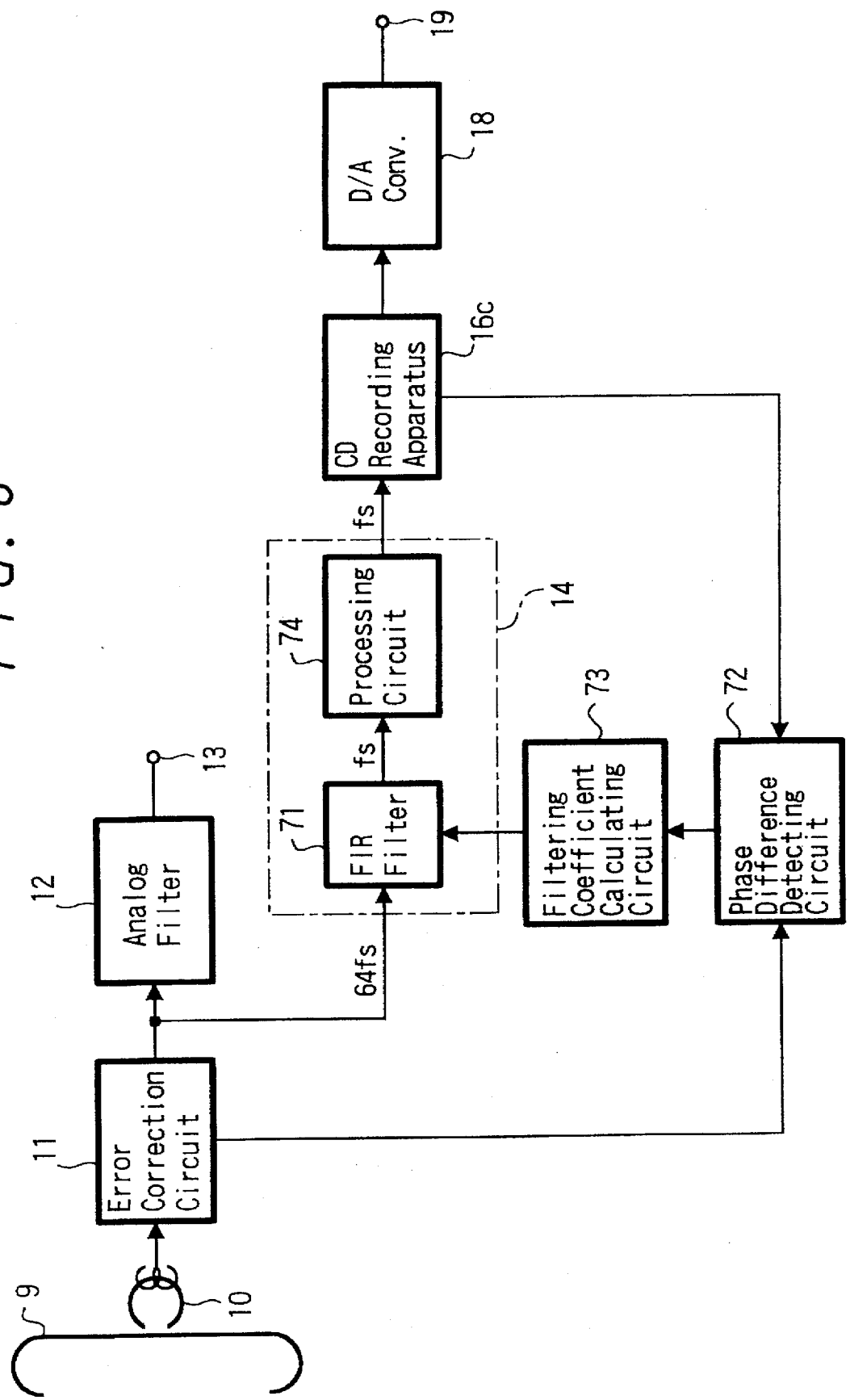
FIG. 8 is a schematic block diagram showing a digital audio transmission apparatus according to a fourth embodiment of the present invention.

Further, in the above-mentioned transmission apparatus, FIG. 8 shows an arrangement of a digital audio transmission apparatus which includes the digital filters 14, 44 for converting a sigma-delta modulated quantized signal into a digital signal with an arbitrary signal format, such as CD format or DAT format according to a fourth embodiment of the present invention. In FIG. 8, like parts corresponding to those of FIG. 4 are marked with the same references and therefore need not be described in detail.

In FIG. 8, the digital signal recorded on the magnetic tape 9 is reproduced by the reproducing head 10 and supplied to the sync separation and error correction circuit 11. The sync separation and error correction circuit 11 extracts and separates the sync signal from the output signal of the reproducing head 10 and also detects and corrects an error by use of error correction codes added when the digital signal is recorded on the magnetic tape 9, e.g., the error correction codes P(0) to P(3) shown in FIG. 3B. The output signal from the sync separation and error correction circuit 11, i.e., sigma-delta modulated signal is supplied to the analog filter 12 and the digital filter 14. The sampling signal of 48 kHz, for example, is supplied from the sync separation and error correction circuit 11 to a phase difference detecting circuit 72 which will be described later on.

The sigma-delta modulated signal, e.g., one-bit signal having a sampling frequency of 64 fs from the sync separation and error correction circuit 11 is supplied to the digital filter 14 composed of a FIR (finite impulse response) filter 71 and a processing circuit 74. The one-bit signal having the sampling frequency of 64 fs is converted by the FIR filter 71 into a 32-bit signal having a sampling frequency of fs. An output of the FIR filter 71 becomes a signal of a predetermined bit number having the same sampling frequency as the signal format of the signal recorded on the recording medium by the recording apparatus 16c. The output signal from the FIR filter 71 is supplied to the processing circuit 74. The signal supplied to the processing circuit 74 is processed by the processing circuit 74 in a noise-shaping fashion so that a quantization noise becomes a desired value or shape. The output signal from the processing circuit 74 is the signal having the same sampling frequency and bit number as those of the signal format of the signal recorded on the recording medium by the recording apparatus 16c. In the embodiment shown in FIG. 8, inasmuch as the recording apparatus 16c uses a disc-shaped optical recording medium as a recording medium and records a signal on the recording medium on the basis of a so-called CD format, the signal output from the processing circuit 74 becomes a 16-bit digital signal having a sampling frequency of 44.1 kHz. The recording apparatus 16c records the signal supplied thereto from the digital filter 14 on the recording medium by a head device. At that time, an output signal based on reflected light from the recording medium is supplied to the D/A converter 18 by the head device of the recording apparatus 16c as a recording monitor output. An output from the D/A converter 18 is output from the output terminal 19 as a monitor signal.

On the other hand, the recording apparatus 16c outputs a clock signal equal to a sampling frequency fs, i.e., clock signal having a frequency of 44.1 kHz. The clock signal of 44.1 kHz output from the recording apparatus 16c is supplied to a phase difference detecting circuit 72. The phase difference detecting circuit 72 is supplied with a clock signal having a frequency equal to the sampling frequency, i.e., clock signal of 64 fs from the sync separation and error correction circuit 11. Therefore, the phase difference detecting circuit 72 detects a phase difference between the clock signal supplied thereto from the recording apparatus 16c and the clock signal supplied thereto from the sync separation and error correction circuit 11. The phase of the clock signal from the sync separation and error correction circuit 11 is of course shifted progressively from that of the clock signal from the recording apparatus 16c. The phase difference detecting circuit 72 supplies a filtering coefficient calculating circuit 73 with a detected signal based on the phase difference between the clock signal from the recording apparatus 16c and the clock signal from the sync separation and error correction circuit 11.

The filtering coefficient calculating circuit 73 calculates 32-bit filtering coefficient data, for example, on the basis of the detected signal which results from detecting by the phase difference detecting circuit 72 the phase difference between the clock signal supplied thereto from the recording apparatus 16c and the clock signal from the sync separation and error correction circuit 11. The filtering coefficient calculating circuit 73 supplies calculated filtering coefficient data to the FIR filter 71. The FIR filter 71 sets filtering coefficients on the basis of the filtering coefficient data calculated by the filtering coefficient calculating circuit 73.

Therefore, in the apparatus shown in FIG. 8, when the frequency of the CD format sampling signal, for example, is 44.1 kHz and this frequency is represented by fs, if the frequency of the sampling signal of the quantized signal output from the sync separation and error correction circuit 11 is 64 fs, then the phase difference detecting circuit 72 detects the phase difference between the clock signal supplied thereto from the recording apparatus 16c and the clock signal supplied thereto from the sync separation and error correction circuit 11. The filtering coefficient data of 32 bits, for example, calculated by the filtering coefficient data calculating 73 in response to this phase difference is supplied to the FIR filter 71 of one stage to set the filtering coefficient of the FIR filter 71. The FIR filter 71 converts the one-bit quantized signal having the sampling frequency of 64 fs into the 32-bit digital audio signal having the sampling frequency of fs.

The 32-bit digital audio signal having the sampling frequency of fs output from the FIR filter 71 is not re-quantized and supplied to the processing circuit 74, in which it is processed in a noise-shaping fashion so that a quantization noise, for example, is concentrated outside the audible area. Thus, the digital filter 14 outputs a CD format 16-bit digital audio signal having a sampling frequency fs. In this way, the one bit quantized signal having the sampling frequency of 64 fs is converted into the CD format 16-bit digital audio signal having the sampling frequency of fs.

As described above, according to the digital audio transmission apparatus shown in FIG. 8, the digital filter 14 includes the phase difference detecting circuit 72 for detecting the phase difference between the sampling signal of the quantized signal and the sampling signal of the output digital audio signal. The sampling frequency is converted by varying the coefficient of the FIR filter 71 on the basis of the calculated result from the filtering coefficient data calculating circuit 73 based on the detected phase difference. Moreover, the filtered-out signal is not re-quantized and the digital audio signal of the arbitrary type is output from the processing circuit 74. Therefore, without re-quantizing the quantized signal, the bit number can be converted and compressed with the result that data can be converted with high accuracy and high audio quality.

Specifically, according to the conventional apparatus, inasmuch as a digital signal has to be calculated in a real time fashion, a processing for processing a digital signal is separated within the circuit to use filters of multiple stages and a re-quantization is effected in order to restrict a data word length, which is repeated, resulting in the digital signal being deteriorated. Although the above-mentioned deterioration of digital signal can be alleviated in a quasi-fashion by adding a dither prior to the re-quantization, the essential deterioration of the digital signal cannot be avoided. On the other hand, according to the aforesaid apparatus, since the temporarily-recorded sigma-delta modulated quantized signal is used, the digital signal need not be processed in a real time fashion so that bit conversion and compression can be carried out by use of a circuit of one stage where a data word length is not restricted while the quantized signal is not re-quantized during the processing. Therefore, data can be converted with high accuracy and high audio quality.

In the aforesaid apparatus, as the FIR filter 71 for filtering out data by use of the filtering coefficient set on the basis of the detected phase difference, there can be used filters of any types so long as a filtering coefficient thereof can be varied. The filtering coefficient data calculating circuit 73 is not limited to the method of calculating data concerning filtering coefficients from the supplied phase difference and may be formed of other suitable means, such as a ROM (read-only memory) table wherein the supplied phase difference value is used as an address input. Further, as described in the aforesaid embodiment, since the phase difference becomes constant when the clock signal from the circuit 11 and the clock signal from the recording apparatus 16c are expressed in the form of ratio of integers, the coefficient of the FIR filter 71 of single stage can be fixed and the phase difference detecting circuit 72 and the filtering coefficient data calculating circuit 73 can be omitted.

Figure 9:
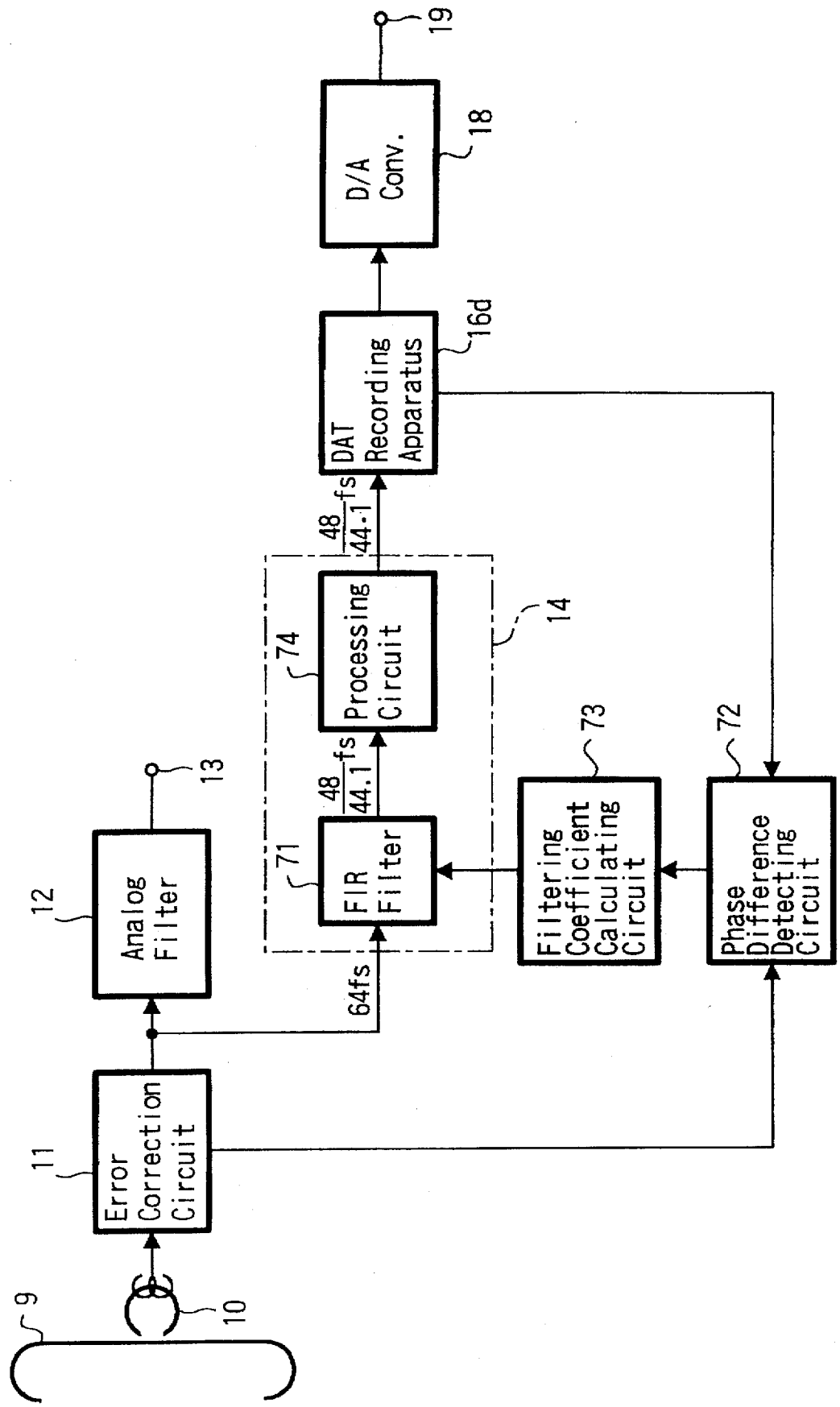
FIG. 9 is a schematic block diagram showing a digital audio transmission apparatus according to a fifth embodiment of the present invention.

FIG. 9 shows an arrangement of a digital audio transmission apparatus according to a fifth embodiment of the present invention wherein a one-bit quantized signal having a sampling frequency of 64 fs is converted into a 16-bit DAT format digital signal having a sampling frequency of 48 kHz. In FIG. 9, like parts corresponding to those of FIG. 8 are marked with the same references and therefore need not be described in detail.

In FIG. 9, if a frequency of a sampling signal is taken as fs, then a frequency of a DAT format sampling signal output from a DAT recording apparatus 16d is expressed as (48/44.1) fs. Accordingly, as shown in FIG. 9, the sigma-delta modulated quantized signal output from the sync separation and error correction circuit 11 is supplied to the FIR filter 71 of single stage constructing the digital filter 14. The clock signal having the frequency of 64 fs from the sync separation and error correction circuit 11 and the clock signal having the frequency of (48/44.1) fs from the DAT recording apparatus 16d, for example, are supplied to the phase difference detecting circuit 72 which detects a phase difference between the two clock signals supplied thereto.

A phase difference detected by the phase difference detecting circuit 72 is supplied to the filtering coefficient data calculating circuit 73. Filtering coefficient data calculated by the filtering coefficient data calculating circuit 73 is supplied to the FIR filter 71 and thereby the filtering coefficient of the FIR filter 71 is varied and set. The FIR filter 71 derives a 32-bit digital audio signal having a sampling frequency of (48/44.1) fs, for example. An output signal from the FIR filter 71 is supplied to the processing circuit 74 which derives a digital audio signal of a bit number determined according to the DAT format, for example.

Therefore, the digital audio signal output from the digital filter 14 can be recorded on a magnetic tape serving as a recording medium by the DAT recording apparatus 16d or an output from a reproducing system of the DAT recording apparatus 16d is supplied to the D/A converter 18 as a monitor output, whereafter a converted analog audio signal can be output from the output terminal 19 as a monitor output.

In the aforesaid transmission apparatus, the sigma-delta modulated quantized signal supplied to the FIR filter 71 constructing the digital filter 14 is not limited to such one output from the sync separation and error correction circuit 11 but the output of the sigma-delta modulator shown in FIG. 2, i.e., quantized signal output from the comparator 4 shown in FIG. 2 may be directly supplied to the FIR filter 71. In this case, the sigma-delta modulator can be integrally formed with the FIR filter 71, the phase difference detecting circuit 72, the filtering coefficient data calculating circuit 73 and the processing circuit 74 as an A/D converter.

Figure 10A:
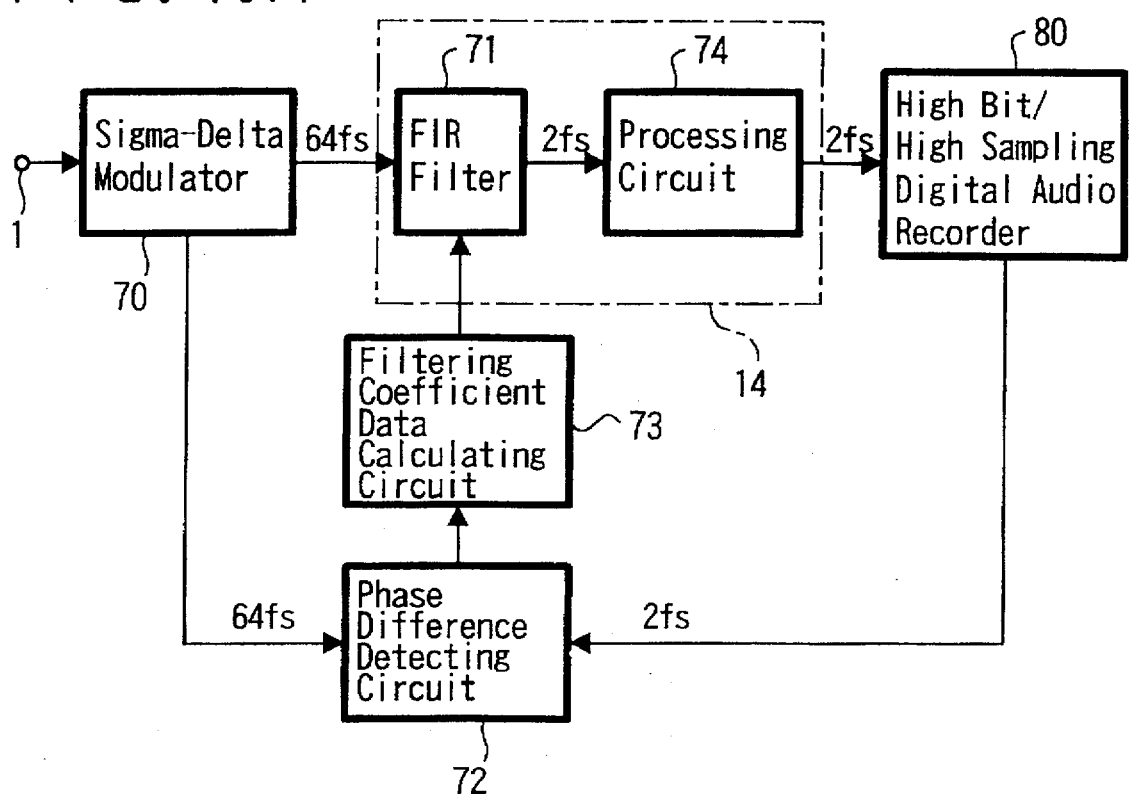
FIG. 10A is a schematic block diagram showing a recording apparatus of a digital audio transmission apparatus according to a sixth embodiment of the present invention.
Figure 10B:
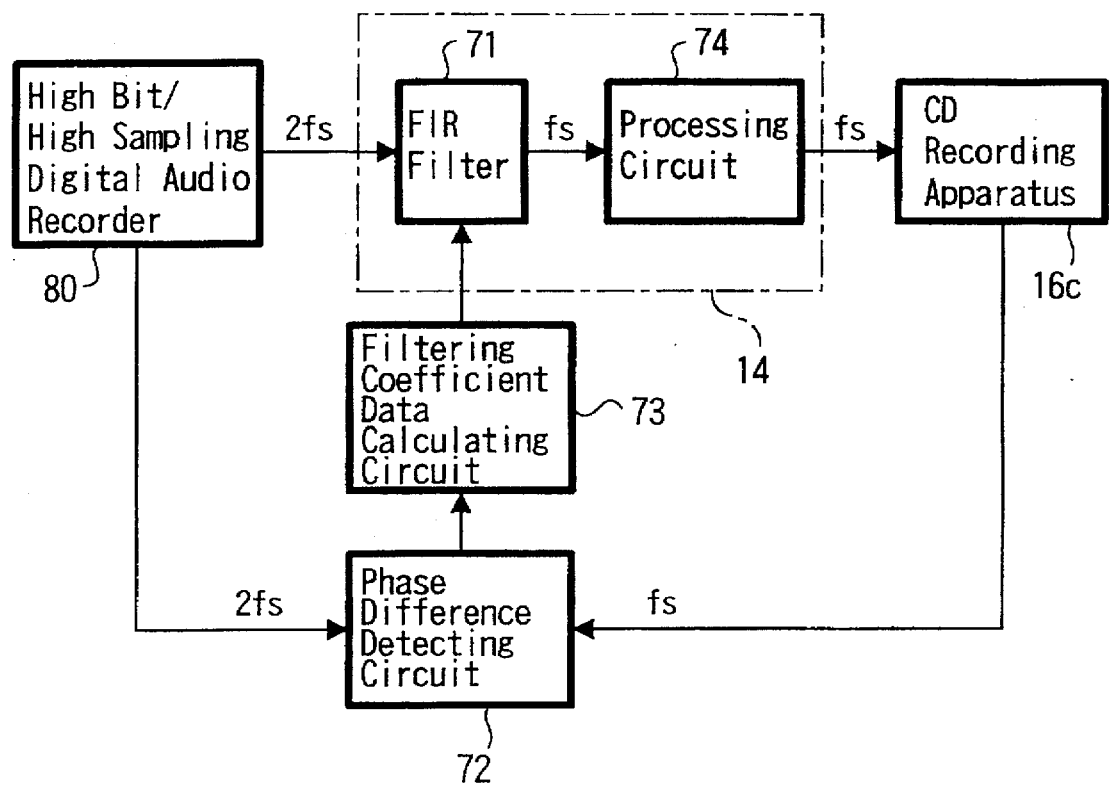
FIG. 10B is a schematic block diagram showing a digital audio transmission apparatus for converting a digital audio signal into a CD format digital audio signal according to the sixth embodiment of the present invention.

FIGS. 10A and 10B show arrangements of a digital audio transmission apparatus according to a sixth embodiment of the present invention wherein a 24-bit digital audio signal having a sampling frequency of 2 fs is recorded by a high bit/high sampling digital audio recorder 80. In FIGS. 10A and 10B, elements and parts identical to those of FIGS. 8 and 9 are marked with the same references and therefore need not be described in detail.

In FIG. 10A, the sigma-delta modulated quantized signal output from the sigma-delta modulator 70 that is composed of the adder 2, the integrator 3, the comparator 4, the delay circuit 5 and the D/A converter 6 is supplied to the FIR filter 71 of single stage constructing the digital filter 14. A clock signal having the sampling frequency of 64 fs from the sigma-delta modulator 70 and a clock signal having a sampling frequency of 2 fs from the high bit/high sampling digital audio recorder 80 are supplied to the phase difference detecting circuit 72 which derives a detected phase difference. Then, the filtering coefficient data calculating circuit 73 calculates filtering coefficient data of the FIR filter 71 on the basis of the detected phase difference supplied thereto from the phase difference detecting circuit 72.

Accordingly, 32-bit filtering coefficient data, for example, is supplied to the FIR filter 71 of single stage and a filtering coefficient of the FIR filter 71 is set on the basis of the filtering coefficient data supplied thereto from the filtering coefficient data calculating circuit 73. As a result, the FIR filter 71 outputs a 32-bit digital audio signal having a sampling frequency of 2 fs. This output signal from the FIR filter 71 is not re-quantized and supplied to the processing circuit 74. Therefore, a 24-bit digital audio signal having a sampling frequency of 2 fs, for example, is output from the processing circuit 74 and recorded on the recording medium by the digital audio recorder 80.

Therefore, in this apparatus, the analog audio signal supplied to the input terminal 1 is recorded on the recording medium by the high bit/high sampling digital audio recorder 80 in the form of the 24-bit digital audio signal having the sampling frequency of 2 fs. In this case, a multi-bit A/D converter which has a complex arrangement need not be provided and also the quantized signal need not be re-quantized. Thus, the digital audio signal can be recorded with high accuracy and high audio quality by the simple arrangement.

Further, when the digital audio signal recorded on the recording medium by the digital audio recorder 80 is reproduced and recorded on a disc-shaped magneto-optical recording medium by the recording apparatus 16c which records a digital audio signal according to the CD format, the operation is carried out as shown in FIG. 10B.

As shown in FIG. 10B, a digital audio signal reproduced from the digital audio recorder 80 is supplied to the FIR filter 71 constructing the digital filter 14. The clock signal having the sampling frequency of 2 fs from the digital audio recorder 80 and the clock signal having the sampling frequency of fs from the recording apparatus 16c are supplied to the phase difference detecting circuit 72. Then, the filtering coefficient data calculating circuit 73 calculates filtering coefficient data of the FIR filter 71 on the basis of the detected phase difference supplied thereto from the phase difference detecting circuit 72.

Thus, 32-bit filtering coefficient data, for example, is supplied to the FIR filter 71 of single stage and a filtering coefficient of the FIR filter 71 is set on the basis of the filtering coefficient data supplied thereto from the filtering coefficient data calculating circuit 73. As a consequence, the FIR filter 71 outputs a 55-bit digital audio signal having a sampling frequency of fs. The output signal from the FIR filter 71 is not re-quantized during a processing and supplied to the processing circuit 74 which derives a digital audio signal having a sampling frequency and a bit number determined according to the CD format. As a result, the digital audio signal output from the digital filter 14 is recorded on the disc-shaped magneto-optical recording medium by the recording apparatus 16c. The digital audio signal output from the digital filter 14 need not always be recorded on the recording medium by the recording apparatus 16c but may be converted into an analog signal and then output as a reproduced signal.

Therefore, according to the transmission apparatus shown in FIGS. 10A and 10B, the 24-bit digital audio signal having the sampling frequency of 2 fs recorded on the recording medium by the high bit/high sampling digital audio recorder 80 is converted into the digital audio signal with the CD format, for example, and then output. Furthermore, when the digital audio signal recorded on the recording medium by the digital audio recorder 80 is converted into the digital audio signal of the CD format, the quantized signal need not be re-quantized and the digital audio signal can be recorded with high accuracy and high audio quality by the simple arrangement.

In the above-mentioned digital audio transmission apparatus, the digital audio recording and reproducing apparatus for recording and reproducing the sigma-delta modulated digital audio signal and the peripheral devices can realize sufficiently high flexibility which can cope with various future digital audio media having wide dynamic range and wide frequency band that can be transmitted (recorded and reproduced).

In order to realize the digital audio recording and reproducing apparatus for recording and reproducing the sigma-delta modulated digital audio signal and the peripheral devices, a mute function is desirable to prevent a noise generated when the supply of a digital audio signal is interrupted due to equipment/failure, and thereby prevent damage to the recording medium and/or equipment connected to the later stage of the digital audio recording and reproducing apparatus. However, there has not hitherto been proposed a method of realizing a mute function by a digital signal processing system which processes the sigma-delta modulated signal.

A second aspect of the present invention contemplates a mute function which can be realized by a digital signal processing system which processes the sigma-delta modulated signal by using the following means. Initially, problems will be described with reference to the one-bit sigma-delta modulated signal.

In the case of the one-bit sigma-delta modulated signal, a sigma-delta modulated signal of an audio signal with a frequency band ranging from a negative maximum value to a positive maximum value as shown in FIG. 11A is converted to a binary pulse number modulated signal of "+1" and "−1" as schematically shown in FIG. 11B. At this time, a point corresponding to a mid-point (i.e., 0V) is converted to a pulse number modulated signal in which a pulse number of "+1" and a pulse number of "−1" are the same as shown in FIGS. 11C and 11D.

This is expressed by the following equation:

$$\sum_{n=0}^{m} Xn = \sum_{n=0}^{m=a+b} (+1)xa + (-1)xb = 0 \rightarrow a = b$$

Therefore, when the one-bit sigma-delta modulated signal is recorded, reproduced and transmitted in actual practice, as shown in FIG. 11B, "+1" is converted to "1" and "−1" is converted to "0".

It is customary that, if a signal is lost when an abnormality occurs during the recording and reproducing process or the transmission line is disconnected, then the signal is fixed to "1" or "0". In that case, consecutive "1" and "0" in the sigma-delta modulated signal are equivalent to the positive maximum value and the negative maximum value, respectively.

Figure 12A:
FIG. 12A is a schematic diagram used to explain a sagma-delta modulated signal.
Figure 12B:
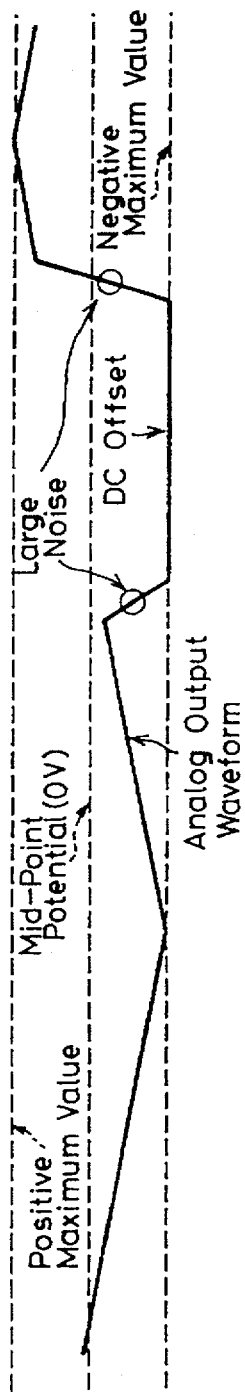
FIG. 12B is a schematic diagram used to explain a sigma-delta modulated signal.
Figure 12C:
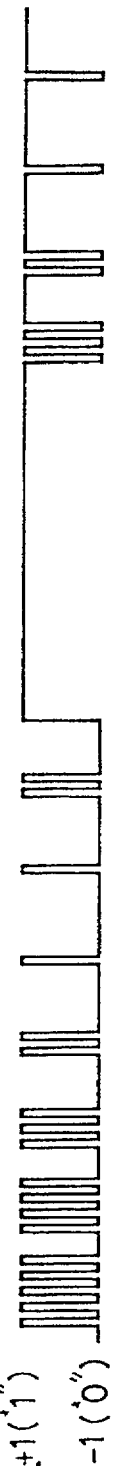
FIG. 12C as a schematic diagram used to explain a sagma-delta modulated signal.
Figure 12D:
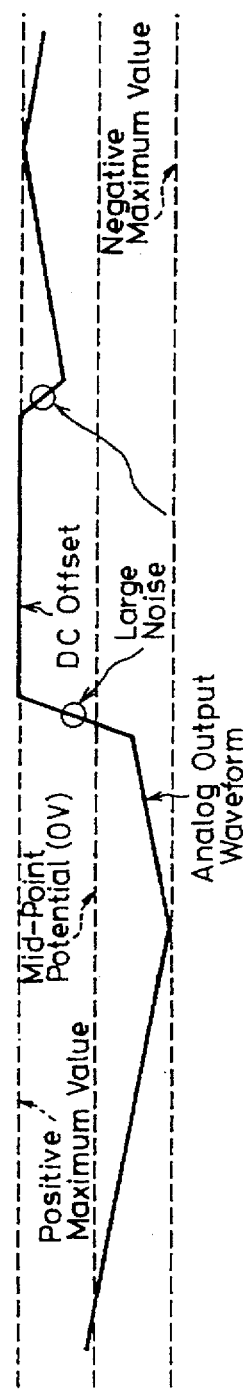
FIG. 12D as a schematic diagram used to explain a sigma-delta modulated signal.

Therefore, the moment an abnormality occurs or the transmission line is disconnected during the recording and reproducing process, there occur maximum output noises and excessive DC offsets shown in FIG. 12A (digital signal), FIG. 12B (analog signal), FIG. 12C (digital signal) and FIG. 12D (analog signal). There is then the risk that an offensive noise will be generated and that the monitor amplifier and speaker will be damaged by such an extreme output signal.

Digital acoustic equipments for PCM (pulse code modulated) data generally handle digital data in the form of 2's complement digital data. Therefore, even if the signal is fixed to all "1" or all "0" after the signal is lost when an abnormality occurs or the transmission line is disconnected during the reproduction process, all "1" or all "0" corresponds to the mid-point, i.e., the mute signal. As a result, the possibility that the monitor amplifier and/or speakers will be damaged is greatly lessened.

This means that, if the signal is lost when the abnormality occurs or the transmission line is disconnected during the recording and reproducing process, then it is possible to realize the mute function. Therefore, with respect to the sigma-delta modulated signal, when the abnormality occurs or the transmission line is disconnected and the signal is lost during the recording and reproducing process, if the signal corresponding to the mid-point is input, then it is possible to realize the mute function.

Figure 13:
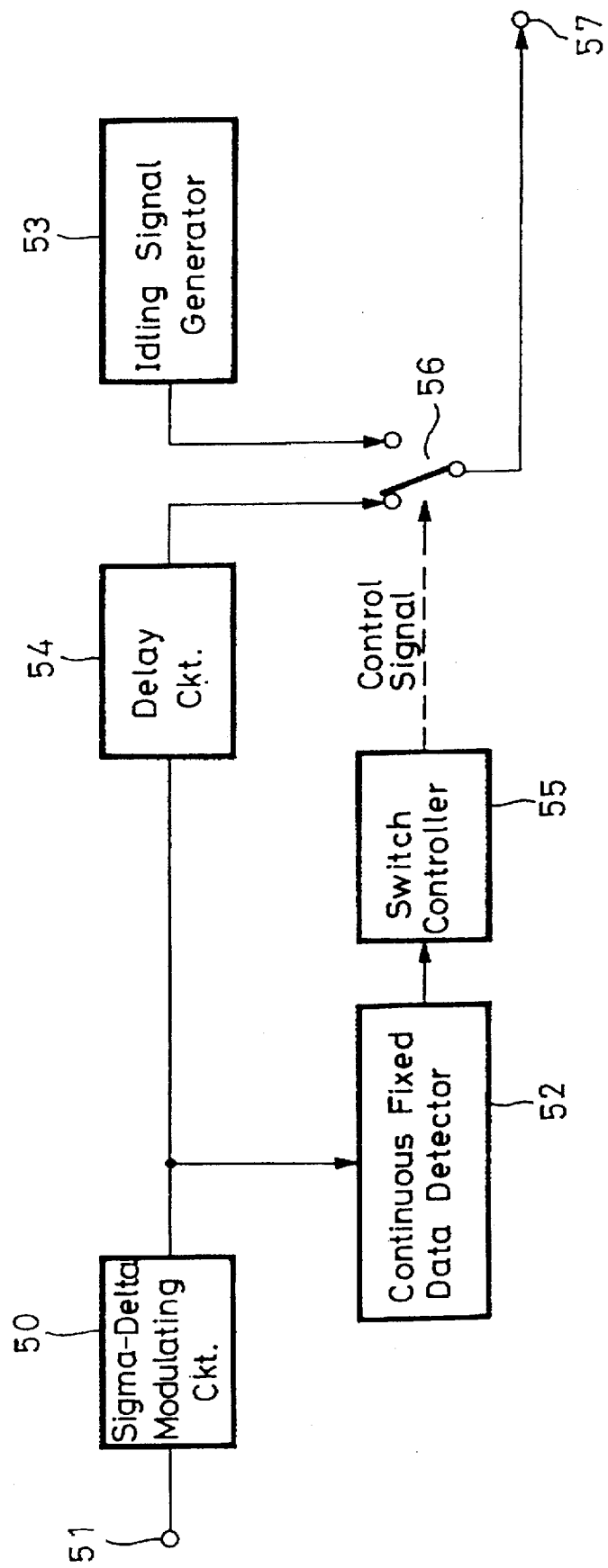
FIG. 13 is a schematic block diagram showing a main portion of a digital audio transmission apparatus according to a seventh embodiment of the present invention.

As shown in FIG. 13, this fundamental arrangement of a digital audio transmission apparatus according to a seventh embodiment of the present invention is composed of an input terminal 51 to which an input audio signal is supplied, a sigma-delta modulating circuit 50 for sigma-delta modulating the input audio signal supplied thereto from the input terminal 51, a continuous fixed data detector 52 for detecting continuous fixed data of duration longer than a certain time period by monitoring the signal which results from sigma-delta modulating the input audio signal by the sigma-delta modulating circuit.

A circuit that realizes the mute function includes a continuous fixed value data detector 52 for detecting a continuous fixed data which a continues for more than a certain predetermined time duration by monitoring an input signal supplied to the input terminal 51, an idling signal generator 53 for generating a sigma-delta modulated signal which is held at the mid-point potential (generally 0V, for example) when demodulated to an analog signal, a delay circuit 54, a switch 56, a switch controller 55 and an output terminal 57.

Operation of this circuit will be described below in which case a one-bit sigma-delta modulated signal is processed.

The continuous fixed value data detector 52 connected to the input terminal 51 detects whether or not an input signal shown in FIG. 14A has fixed value data continued for more than a certain time which does not exist in the sigma-delta modulated audio signal. When the fixed value data is detected, it is necessary to monitor the signal during a predetermined time. Therefore, in order to prevent the fixed value signal from being output during this detection, the input signal is input to the delay circuit 54 which delays the input signal by a delay time required when the fixed value data is detected and the switch 56 is switched.

If the continuous fixed value data detector 52 detects the continuous fixed value data continues for more than the predetermined time duration, the switch controller 55 generates a control signal shown in FIG. 14B which controls the switch 56 such that the switch 56 switches the signal shown in FIG. 14C of the delay circuit 54 to a signal shown in FIG. 14D from the idling signal generator 53. Then, the switch 56 switches the output to the idling signal and this circuit is placed in the mute state. The signal thus switched shown in FIG. 14E is output from the output terminal 57.

When the fixed value data in which the input signal is continued is recovered to a normal sigma-delta modulated signal, the continuous fixed value data detector 52 detects the change of data. In this case, the input signal is input to the delay circuit 54 which delays a signal by a predetermined delay time required when the fixed value data is detected and the switch 56 is switched. In order to prevent an excessive output to the terminal 57 when recovery is achieved, the switch controller 55 provides a releasing control signal shown in FIG. 14B at a predetermined delay time, sufficient to allow recovery of a normal sigma-delta modulated signal, to cause the switch 56 to switch the output of the delay circuit 54 to the output terminal Accordingly, in this apparatus, an output shown in FIG. 14E is developed at the output terminal 57. Then, this signal is changed to a signal shown in FIG. 14F when demodulated to the analog signal and it is possible to prevent the excessively large noise and the DC offset from being generated. Specifically, according to this signal, a noise of small level is generated but this noise is not so offensive and cannot destroy the monitor amplifier and speaker.

As described above, it is possible to realize the mute function used when the continuous fixed value data continued for more than a certain time, which does not exist in the sigma-delta modulated audio signal, is entered into the input signal.

While the sigma-delta modulated signal is drawn as the waveform of a regular modulation pattern in order to schematically express the sigma-delta modulated signal in FIGS. 11A to 12D and FIGS. 14A to 14F, a practical sigma-delta modulated signal has a little irregularity. Therefore, when the input signal is switched to the idling signal or the idling signal is switched to the input signal, it is possible to detect a portion in which the signal pattern of the input signal and the signal pattern of the idling signal are agreed with each other during a short period.

Figure 15:
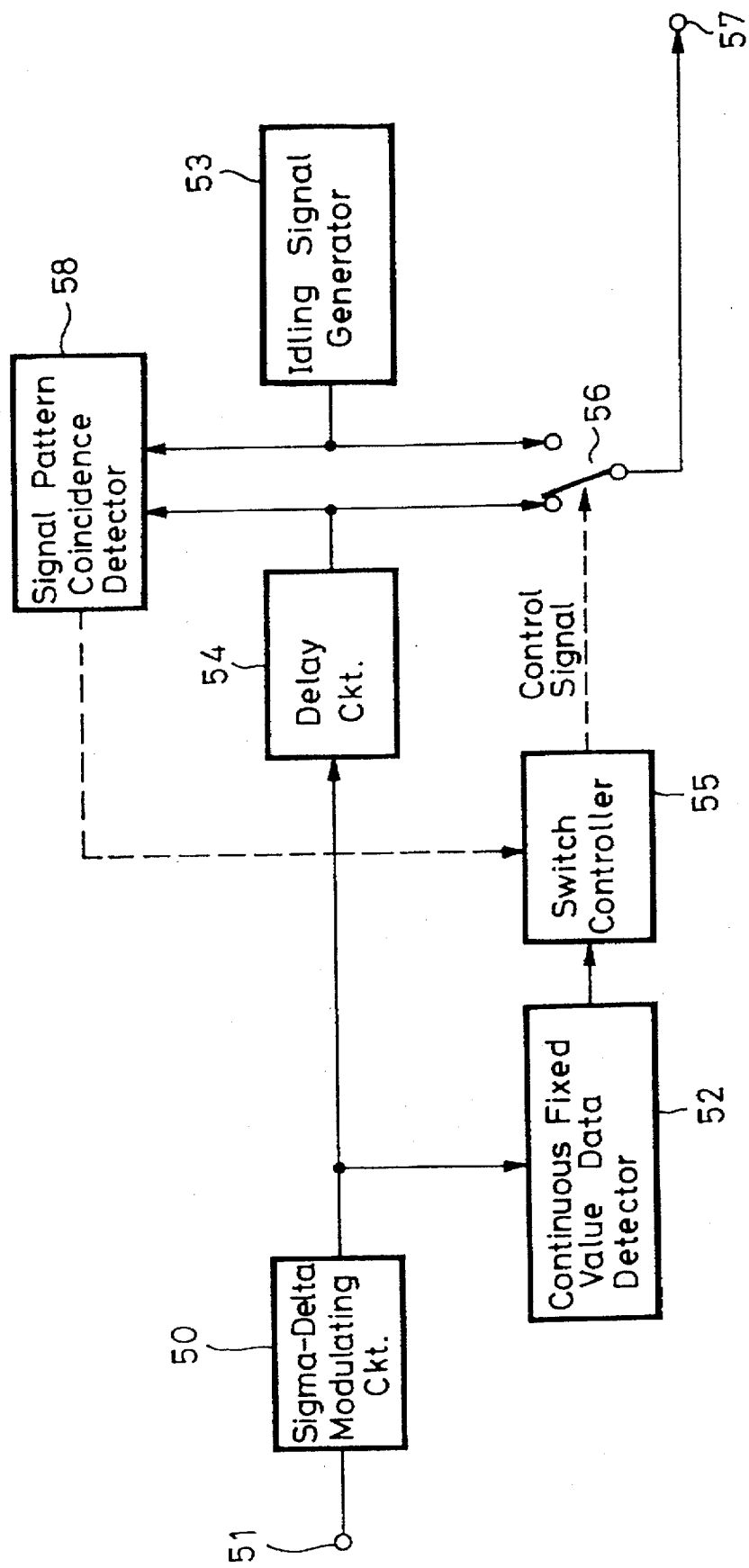
FIG. 15 is a schematic block diagram showing a main portion of a digital audio transmission apparatus according to an eighth embodiment of the present invention.

Accordingly, if the coincidence between the signal pattern of the input signal and the signal pattern of the idling signal is detected and the signal is switched, then it is possible to suppress a transient (shock) noise generated when the mute is released. FIG. 15 shows in block form an arrangement of the digital audio transmission apparatus according to an eighth embodiment of the present invention in which a signal pattern coincidence detector 58 is provided additionally, and FIGS. 16A through 16F show signals of respective portions corresponding to a series of signal flow. In FIGS. 15 and FIGS. 16A through 16F correspond to FIG. 13 and FIGS. 14A through 14F and parts and elements identical to those of FIG. 13 and FIGS. 14A through 14F are marked with the same references.

As shown in FIG. 15, the continuous fixed value data detector 52 connected to the input terminal 51 detects whether or not an input signal shown in FIG. 16A has the continuous fixed value data continued for more than a certain time which does not exist in the sigma-delta modulated signal. When the fixed value data is detected, it is necessary to monitor the signal during a predetermined time. In order to prevent the fixed value signal from being output during this detection, the input signal is input to the delay circuit 54 which delays the input signal by the delay time required when the fixed value data is detected and the switch is switched.

If the continuous fixed value data detector 52 detects the continuous fixed value data continued for more than a predetermined time, then the switch controller 55 generates a control signal shown in FIG. 16B which switches the switch 56 so that the signal shown in FIG. 16C from the delay circuit 54 is switched to the signal shown in FIG. 16D from the idling signal generator 53. Then, the output is switched to the idling signal side and the circuit is placed in the mute state. The signal shown in FIG. 16E thus switched is developed at the output terminal 57.

When the input signal is recovered from the continuous fixed value data to the normal sigma-delta modulated signal, the continuous fixed value data detector 52 detects the change of data. Since the input signal is input to the delay circuit 54 which delays the input signal by the delay time required when the continuous fixed data is detected and the switch is changed-over, if the switch 56 is switched immediately after the change of data is detected, then the continuous fixed value data remaining in the delay circuit 54 is output and an excessively large noise and a DC offset are generated.

Therefore, the mute release control signal shown in FIG. 16B output from the switch controller 55 is delayed by the delay circuit 54 by the delay time required after the change of data is detected and then output. Concurrently therewith, the signal shown in FIG. 16C from the delay circuit 54 and the signal shown in FIG. 16D from the idling signal generator 53 are supplied to the signal pattern coincidence detector 58. If it is determined that these signal patterns are agreed with each other, then the output is switched to the input signal side and then the mute is released.

Thus, the signal is returned to the normal sigma-delta modulated signal and the mute is released at the portion in which the coincidence between the signal patterns is detected. Therefore, it is possible to realize the mute function used when the continuous fixed value data continued for more than the predetermined time, which does not exist in the sigma-delta modulated signal, is entered into the input signal. Also, if the coincidence between the signal pattern of the input signal and the signal pattern of the idling signal is detected and the signal is switched, then it is possible to suppress the shock noise generated when the mute function is released.

Figure 17A:
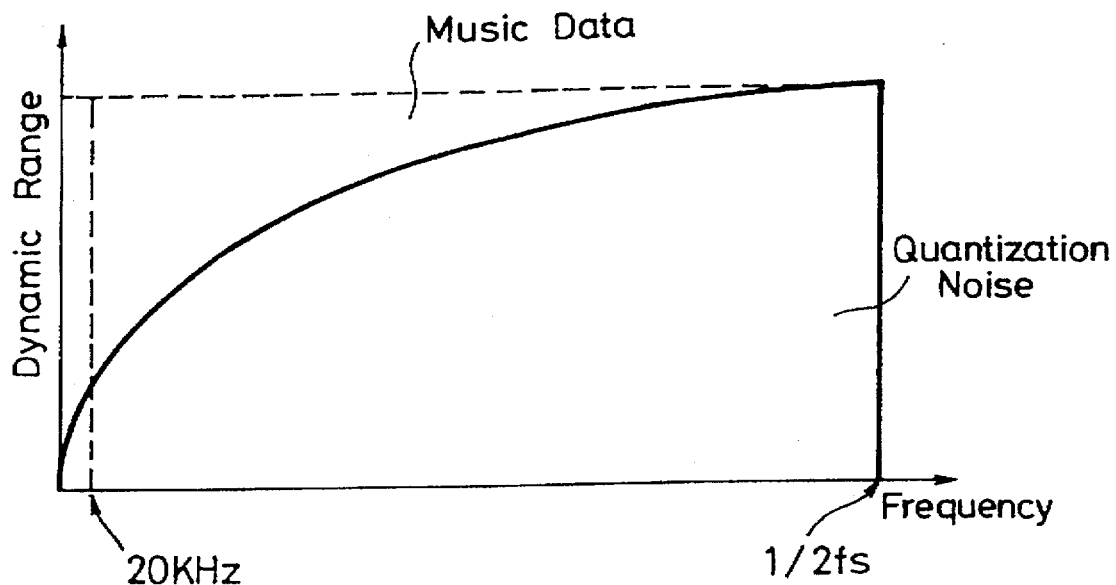
FIG. 17A is a diagram used to explain operation of the digital audio transmission apparatus according to the present invention.
Figure 17B:
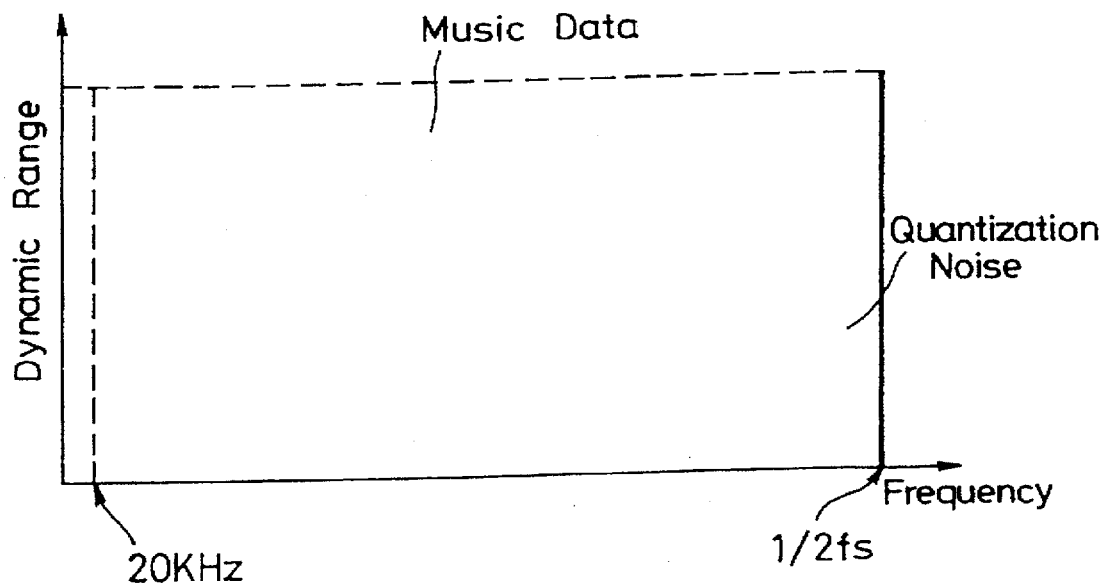
FIG. 17B is a diagram used to explain operation of the digital audio transmission apparatus according to the present invention.

Further, the idling signal generator 53 may generate a signal corresponding to a mid-point according to a sigma-delta modulation similarly to the input signal. In this case, a signal of an audio band is lost and a noise of substantially high frequency band peculiar to the sigma-delta modulation shown in FIG. 17A is left. If a signal of a period of one half of the sampling frequency fs of the sigma-delta modulation is used as the idling signal, then a signal spectrum is formed of only a component of ½ of the sampling frequency fs as shown in FIG. 17B. Therefore, it is possible to suppress the noise.

Figure 18:
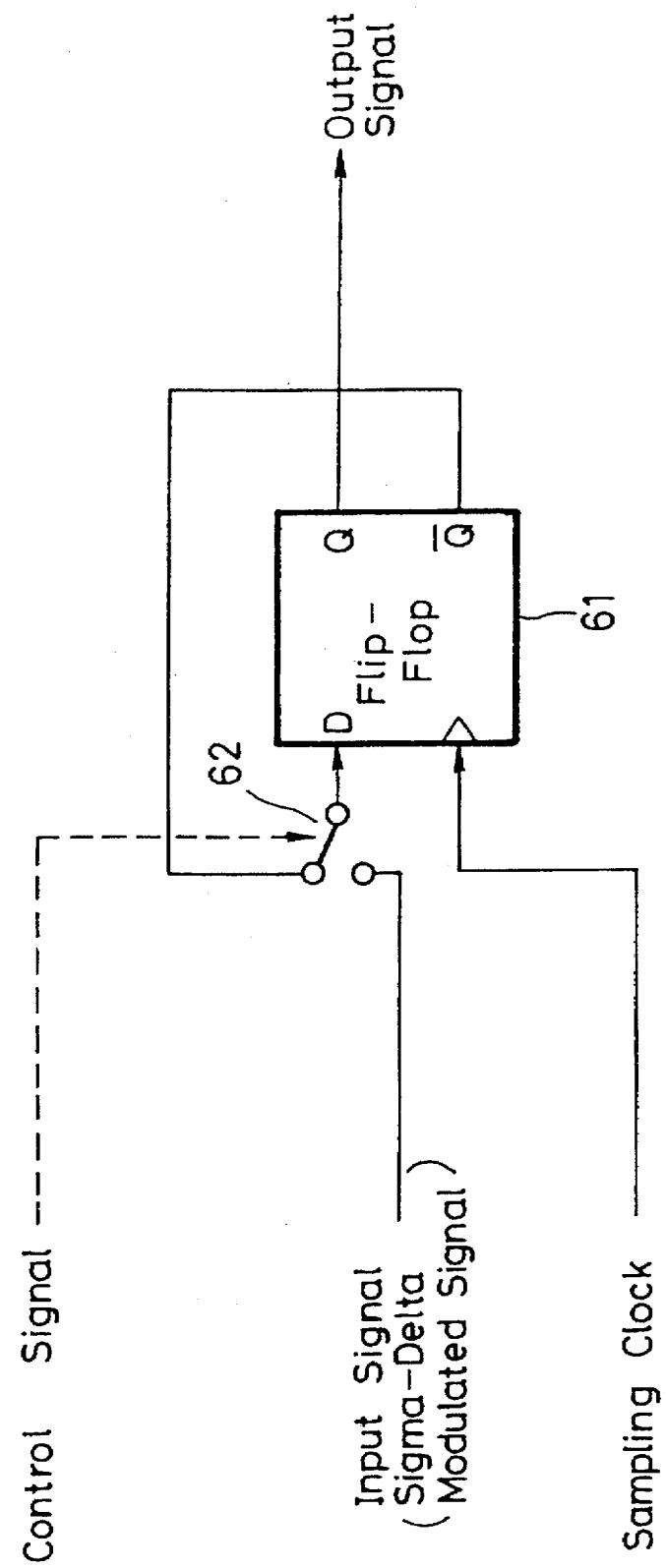
FIG. 18 is a block diagram showing a main portion of a digital audio transmission apparatus according to a ninth embodiment of the present invention.

In the case of the one-bit sigma-delta modulation, as shown in FIG. 18, it is possible to realize the mute function by a D-type flip-flop 61 and a switch 62. Thus, the circuit arrangement can be simplified.

As shown in FIG. 18, a sigma-delta modulated signal of the input signal is supplied through the switch 62 to the D-terminal of the D-type flip-flop 61. The D-type flip-flop 61 is supplied at its clock terminal with a sampling clock signal. The D-type flip-flop 61 derives a positive output signal and an inverted output signal of the D-type flip-flop 61 is supplied to the switch 62. Then, the switch 62 is changed over in response to the control signal.

Therefore, in this apparatus, when the switch 62 is changed over in response to the control signal, the inverted output signal is supplied to the D-terminal of the D-type flip-flop 61. Thus, the D-type flip-flop 61 derives a signal which is inverted in response to the sampling clock signal. As described above, it is possible to realize the mute function in which the signal of the period of 1/1 of the sampling frequency fs of the sigma-delta modulation by the D-type flip-flop 61 and the switch 62.

As described above, according to the above-mentioned apparatus, it is possible to prevent the noise of the maximum level from being generated when an abnormality occurs in the transmission system by switching the quantized signal to the predetermined idling signal.

While the one-bit sigma-delta modulation is described above by way of example, the present invention is not limited thereto and it is apparent that the mute function can be realized with the similar arrangement with respect to multi-bit sigma-delta modulation.

Further, the mute function circuit according to the present invention can be used as an external digital mute function circuit in an A/D converter LSI and a D/A converter LSI having a sigma-delta modulation front end which is now produced.

According to the present invention, it becomes possible to easily expand the quantized bit number by effecting the transmission by using the so-called sigma-delta modulation. Furthermore, it is possible to prevent the noise of maximum level from being generated when the abnormality occurs in the transmission system by switching the quantized signal to the predetermined idling signal.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

It will be recognized that the present invention is not limited to a digital audio recorder, but may be embodied as an independent processing device which may be connected between an input source, such as a microphone, and the input of a digital recording device, such as, for example a digital audio tape recorder. As noted thereby are many variations of the present invention which can be effected by one skilled in the art without departing from the scope of claims herein.

What is claimed is:

1. An audio signal processing apparatus comprising:

sigma-delta modulating means for outputting a sigma-delta modulated audio signal by sigma-delta modulating an input audio signal;

a detecting circuit for detecting that said sigma-delta modulated audio signal takes a fixed value during a time period longer than a predetermined time;

idling signal generating means for generating an idling signal;

a delay circuit for delaying said sigma-delta modulated audio signal by a predetermined period; and switching means for switching and outputting a delayed signal from said delay circuit and said idling signal based on a detected result of said detecting circuit.

2. An audio signal processing apparatus according to claim 1, wherein said switching means outputs said idling signal when said detecting circuit detects that said sigma-delta modulated audio signal takes a fixed value during a time period longer than a predetermined time.

3. An audio signal processing apparatus according to claim 1, further comprising a pattern detecting circuit for detecting whether or not a pattern of said delayed signal from said delay circuit and a pattern of said idling signal are agreed and wherein said switching means switches said idling signal to said delayed signal and outputs said delayed signal when said pattern detecting circuit detects that the pattern of said delayed signal and the pattern of said idling signal are agreed.

4. An audio signal transmitting apparatus comprising:

a microphone;

a sigma-delta modulating circuit for sigma-delta modulating an audio signal supplied thereto from said microphone;

means for transmitting a sigma-delta audio signal supplied thereto from said sigma-delta modulating circuit; and a filter for receiving and filtering out said sigma-delta modulated audio signal transmitted thereto.

5. An audio recording device comprising:

an input terminal for receiving an input audio signal;

a recording circuitry for recording audio data on a recording medium;

a sigma-delta modulator for modulating said input audio signal and outputting a sigma-delta modulated audio signal;

a detecting circuit for detecting when said sigma-delta modulated audio signal maintains a fixed value for greater than a predetermined period of time;

an idling signal generator for generating an idling signal, said idling signal having an amplitude which is substantially equal to the mid-point potential of said input audio signal;

a delay circuit for delaying said sigma-delta modulated audio signal for a predetermined period of time and outputting a delayed sigma-delta modulated audio signal;

a switch for alternately inputting said delayed sigma-delta modulated audio signal to said recording circuitry; and a controller for controlling said switch to input said idling signal to said recording circuitry where said detecting circuit detects that said sigma-delta modulated audio signal has maintained a fixed value for greater than a predetermined period of time.

6. An apparatus for recording and/or reproducing a digital audio signal comprising:

modulating means for sigma-delta modulating an input audio signal;

adding means for adding a synchronizing signal and an error correction code to said modulated audio signal supplied thereto from said modulating means;

recording and/or reproducing means for recording an output signal output from said adding means on a recording medium and/or reproducing a signal recorded on said recording medium;

signal processing means for extracting said synchronizing signal from a signal reproduced from said recording medium by said recording and/or reproducing means and correcting an error on the basis of said added error correction code and producing an output signal for digital recording;

converting means for converting said output signal output from said signal processing means into a digital signal having a predetermined format and including an FIR (finite impulse response) filter for converting said output signal supplied thereto from said signal processing means into a digital signal having a predetermined sampling frequency and noise-shaping processing means for noise-shaping processing said digital signal supplied thereto from said FIR filters; and an analog filter for converting said output signal from said signal processing means into an analog signal for analog recording.

7. An apparatus for recording and/or reproducing a digital audio signal according to claim 6, wherein said converting means is composed of a decimation filter.

8. An apparatus for recording and/or reproducing a digital audio signal according to claim 6, further comprising recording means for recording said output signal supplied thereto from said converting means on said recording medium.

9. An apparatus for recording and/or reproducing a digital audio signal according to claim 6, further comprising detecting means for detecting a phase difference between a sampling signal output thereto from said signal processing means and a sampling signal output thereto from said recording means and wherein a conversion operation of said converting means is controlled on the basis of a detected signal from said detecting means.

10. An apparatus for recording and/or reproducing a digital audio signal according to claim 9, further comprising calculating means for calculating filter coefficient data of said FIR filter on the basis of said detected signal supplied thereto from said detecting mean and wherein a coefficient of said FIR filter is set on the basis of said filter coefficient data calculated by said calculating means.

11. An apparatus for recording and/or reproducing a digital audio signal comprising:

modulating means for sigma-delta modulating an input audio signal;

first converting means for converting a bit number and a sampling frequency of said sigma-delta modulated digital audio signal supplied thereto from said modulating means into first predetermined values and including a first FIR filter for converting said sigma-delta modulated digital audio signal supplied thereto from said modulating means into a digital signal having a first predetermined bit number and a first predetermined sampling frequency and first noise-shaping processing means for noise-shaping processing without requantizing a digital signal supplied thereto from said first FIR filter, first recording and/or reproducing means for recording an output signal output thereto from said first converting means on a recording medium and/or reproducing a signal recorded on said recording medium;

second converting means for converting a bit number and a sampling frequency of a digital signal supplied thereto from said first converting means into second predetermined values and including a second FIR filter for converting a digital signal supplied thereto from said recording and/or reproducing means into a digital signal having a second predetermined bit number and a second predetermined sampling frequency and second noise-shaping processing means for noise-shaping processing without requantizing a digital signal supplied thereto from said second FIR filter; and second recording and/or reproducing means for recording and/or reproducing digital signal supplied thereto from said second converting means.

12. An apparatus for recording and/or reproducing a digital audio signal according to claim 11, further comprising first detecting means for detecting a phase difference between a clock signal output thereto from said first recording and/or reproducing means and a clock signal supplied thereto from said modulating means, and second detecting means for detecting a phase difference between a clock signal supplied thereto from said first recording and/or reproducing means and a clock signal supplied thereto from said second recording and/or reproducing means and wherein a conversion operation of said first converting means is controlled on the basis of a detected signal supplied thereto from said first detecting means and a conversion operation of said second converting means is controlled on the basis of a detected signal supplied thereto from said second detecting means.

13. An apparatus for recording and/or reproducing a digital audio signal according to claim 12, further comprising first calculating means for calculating filter coefficient data of said first FIR filter on the basis of said detected signal supplied thereto from said first detecting means and second calculating means for calculating filter coefficient data of said second FIR filter on the basis of said detected signal supplied thereto from said second detecting means and wherein a coefficient of said first FIR filter is set on the basis of filter coefficient data calculated by said first calculating means and a coefficient of said second FIR filter is set on the basis of filter coefficient data calculated by said second calculating means.

14. A microphone device comprising:

a microphone unit;

an amplifier for amplifying the output signal from said microphone unit;

sigma-delta modulating means for modulating the output signal from said amplifier;

an output terminal for outputting the modulated output signal from said sigma-delta modulating means and connected to an external equipment; and a casing for containing therein said microphone unit, said amplifier, said sigma-delta modulating means and said output terminal.

15. A microphone device according to claim 14, wherein said device further comprises signal processing means for adding a synchronizing signal and an error detecting and correcting code to the output signal from said sigma-delta modulating means, the output signal from said signal processing means being supplied to said output terminal.

* * * * *